(12) United States Patent
Higashi et al.

(10) Patent No.: US 6,682,688 B1
(45) Date of Patent: Jan. 27, 2004

(54) METHOD OF MANUFACTURING A THREE-DIMENSIONAL OBJECT

(75) Inventors: Yoshikazu Higashi, Moriyama (JP); Norio Yoshida, Nara (JP); Isao Fuwa, Osaka (JP); Yoshiyuki Uchinono, Hirakata (JP)

(73) Assignee: Matsushita Electric Works, Ltd., Osaka (JP)

( * ) Notice: Subject to any disclaimer, the term of this patent is extended or adjusted under 35 U.S.C. 154(b) by 363 days.

(21) Appl. No.: 09/596,198

(22) Filed: Jun. 16, 2000

(51) Int. Cl.$^7$ .................. B23K 26/00; B29C 35/08; B29C 41/20
(52) U.S. Cl. .................. 264/497; 264/257; 264/258; 264/308; 264/482; 156/272.8; 156/273.5; 156/275.5; 156/298; 156/303.1; 156/379.8
(58) Field of Search ............... 264/497, 400, 264/482, 257, 258, 308; 156/272.8, 273.3, 379.8, 275.5, 298, 303.1

(56) References Cited

U.S. PATENT DOCUMENTS

| | | | | |
|---|---|---|---|---|
| 579,549 A | * | 3/1897 | Rust ..................... | 505/329 |
| 4,750,084 A | * | 6/1988 | Nikaidoh et al. .......... | 361/321 |
| 4,752,352 A | * | 6/1988 | Feygin .................. | 156/630 |
| 4,863,538 A | | 9/1989 | Deckard | |
| 5,169,579 A | * | 12/1992 | Marcus et al. ........... | 264/81 |
| 5,173,220 A | * | 12/1992 | Reiff et al. ............. | 264/22 |
| 5,555,481 A | | 9/1996 | Rock et al. | |
| 5,637,175 A | * | 6/1997 | Feygin et al. ............ | 156/264 |
| 5,658,412 A | * | 8/1997 | Retallick et al. ......... | 156/272.8 |
| 5,779,833 A | * | 7/1998 | Cawley et al. ........... | 156/89.11 |
| 6,036,777 A | * | 3/2000 | Sachs ................... | 118/56 |
| 6,066,285 A | * | 5/2000 | Kumar .................. | 264/439 |
| 6,155,331 A | * | 12/2000 | Langer et al. ........... | 164/456 |
| 6,193,922 B1 | * | 2/2001 | Ederer .................. | 264/401 |
| 6,354,361 B1 | * | 3/2002 | Sachs et al. ............ | 164/128 |

FOREIGN PATENT DOCUMENTS

| | | |
|---|---|---|
| JP | 60-48221 | 3/1985 |
| WO | 88/02677 | 4/1988 |

OTHER PUBLICATIONS

English Language Abstract of JP 60–48221.

\* cited by examiner

*Primary Examiner*—Stefan Staicovici
(74) *Attorney, Agent, or Firm*—Greenblum & Bernstein, P.L.C.

(57) ABSTRACT

A three-dimensional object is manufactured by filling and hardening a powder material around a core. A powder material is first filled and layered around the core, and a beam is then selectively irradiated on the layer of powder material to form a hardened layer united with the core. These steps are repeated to form a plurality of hardened layers around the core, thereby manufacturing the three-dimensional object having the core embedded therein.

1 Claim, 32 Drawing Sheets

Fig. 24A
Fig. 24B
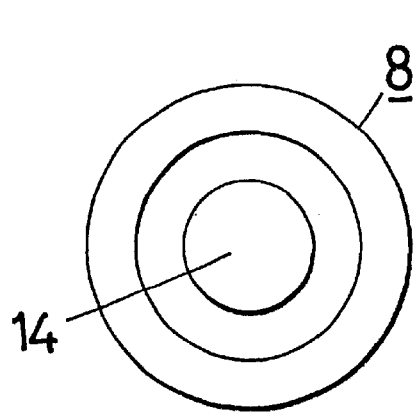
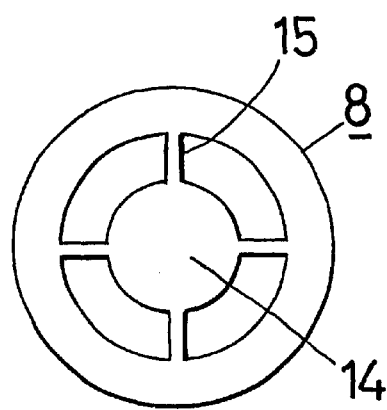
Fig. 24C
Fig. 24D
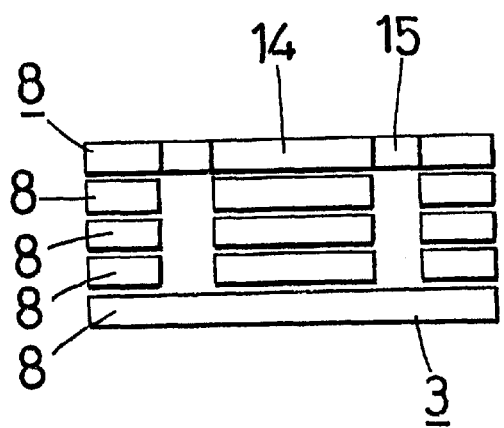
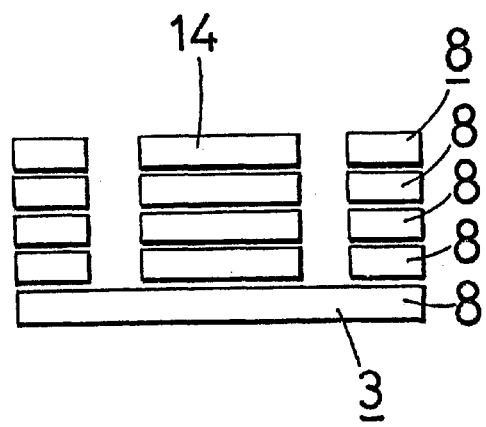

METHOD OF MANUFACTURING A THREE-DIMENSIONAL OBJECT

BACKGROUND OF THE INVENTION

1. Field of the Invention

The present invention relates to a method of manufacturing a three-dimensionally shaped object in which the shaped object is obtained by successively laminating hardened layers of hardened powder material.

2. Description of the Related Art

A method as shown in FIGS. 50A and 50B of manufacturing a three-dimensional object by successively laminating hardened layers 102 of hardened powder material 101 is well known. This is disclosed in Japanese Patent No. 2620353 as a "Method of manufacturing parts by selective sintering." According to this Patent, the powder material 101, which is an organic material such as a resin or an inorganic material such as a metal, is first accumulated and then hardened to form a hardened layer 102 by irradiating thereon an optical beam (laser beam 112) such as a laser or directional energy beam. The hardened layers 102 thus obtained are laminated one above another to form a three-dimensional object.

In this case, as shown in FIG. 50A, the powder material 101 is supplied from a hopper 129 to an enclosing structure 130, and as shown in FIG. 50B, a laser beam 112 is selectively irradiated onto a predetermined position. This is repeatedly carried out to form a laminate of the hardened layers 102. The laser beam 112 is emitted from a laser head 131 and is operated in such a way that the direction of its path is altered by a scanning system 133 including a prism 132 so that a predetermined position on the powder material 101 of the uppermost layer within the enclosing structure 130 is selectively irradiated. Accordingly, a complex shaped object can be manufactured comparatively easily.

In the above-described prior art, however, the packing density of the powder material 101 is low and, hence, the density after irradiation and hardening does not become 100%. For this reason, there are problems in that the strength of the manufactured shaped object is weaker by comparison with the essential mechanical strength of the material. There are additional problems in that although the laser beam 112 must be scanned to form the hardened layers 102, the shaping time becomes long because the amount of scanning data within the contour lines of the shaped object is large. There are further problems in that, because the powder material 101 contracts when it is hardened, the hardened layers 102 are deformed and a shaped object of satisfactory precision cannot be manufactured.

SUMMARY OF THE INVENTION

The present invention has been developed to overcome the above-described disadvantages.

It is accordingly an objective of the present invention to provide a method of manufacturing a three-dimensional object which is capable of easily manufacturing a shaped object of high strength and high precision, even if the shape thereof is complex.

In accomplishing the above and other objectives, the method according to the present invention is characterized by: (a) filling a powder material around a core so as to form a layer of powder material; (b) selectively irradiating a beam on the layer of powder material to form a hardened layer united with the core, and (c) repeating the steps (a) and (b) to form a plurality of hardened layers around the core.

According to this method, if the core is so formed as to have a high density and a high strength, the shaped object has a high strength as a whole. Moreover, only the powder material in the outer region in the proximity of the core needs to be successively hardened to form a laminated structure, and the amount of scanning data, for the scanning of the beam which affords the hardening at this time, is reduced within the contour lines of the shaped object. As a result, the scanning time is shortened and, even if the shape is complex, the shaping time can be also shortened. In addition, because the amount of powder material to be hardened is reduced, distortion or deformation due to contraction during hardening is prevented and a high precision shaped object can be manufactured.

Furthermore, by lowering the core by a dimension equivalent to the thickness of each hardened layer, the hardened layers are successively laminated around the core. Also, the powder material can be filled easily after each hardening, and the distance setting and the like of the beam to be irradiated thereon is also easy.

The core is made up of a plurality of sheet materials laminated one above another that are united together before the steps (a) and (b), and each of the sheet materials is an organic material or an inorganic material. Because the core is integrated in advance, it can be easily made even if the shaped object has a complicated shape.

Alternatively, each of the plurality of sheet materials is laminated before the step (a). By so doing, there is no need for the sheet materials to be integrally laminated in advance, and the core can be formed simply by successively laminating the sheet materials prior to the formation of the hardened layers. Also, the core forms no obstruction to the filling of the powder material.

Advantageously, each of the plurality of sheet materials has a through-hole, in which the powder material is filled and hardened to unite neighboring sheet materials. In this case in particular, the sheet materials are joined by the hardening of the powder materials filled into the through-holes, so the joining strength between the sheet materials is enhanced and the distortion of the sheet materials due to heat effects during hardening of the powder material is prevented, resulting in a shaped object of higher density and higher precision. Furthermore, the sheet materials can be appropriately positioned with each other without lateral offsetting.

The through hole can be so formed as to extend through all of the plurality of sheet materials. The through- hole may be inclined.

Each sheet material may be coated with a powder material, wherein a beam is irradiated thereon to unite neighboring sheet materials, resulting in a shaped object of high strength.

The powder material may have a melting point lower than that of the sheet materials.

Each sheet material may have an independent area connected thereto via a plurality of connecting portions, which are removed during or after the shaping.

When a box-shaped object is manufactured, the powder material is filled in a space formed at an edge portion of each sheet material.

It is preferred that the plurality of sheet materials be appropriately positioned by at least one positioning member. The positioning member is a movable member driven by a separate device, or is formed on at least one of the plurality of sheet materials. Alternatively, the positioning member is formed by irradiating a beam on a powder material coated on the at least one of the plurality of sheet materials. Again alternatively, the plurality of sheet materials are appropriately positioned by protrusions formed thereon. Each of the plurality of sheet materials may have a positioning piece integrally formed therewith, which is brought into contact with a separate positioning member.

All the sheet materials do not have the same thickness, that is, the plurality of sheet materials may have different thickness. In this case, the thickness of the sheet materials are set to be thick at positions where the inclination of the outer side surface of the core is steep and to be thin at positions where the inclination is gentle. Accordingly, the level difference generated at the edges of the sheet materials can be reduced, making it possible to smoothly finish the surface of the shaped object.

A solidified powder layer may be interposed between neighboring sheet materials. In this case in particular, even if the laminated surface of the sheet materials has a complicated shape, a shaped object having a fine and complicated shape can be easily manufactured by arranging the solidified powder layer in position between the neighboring sheet materials.

The layer of powder material filled around each sheet material may have a tapered upper surface formed by vibration. By so doing, smooth-finishing of the surface of the shaped object can be achieved. Moreover, when polishing is performed, the amount to be removed is reduced, making it possible to reduce the finishing time.

The core and the powder material may be made of different materials. In this case, shaped objects having a high surface hardness such, for example, as cutters, grinding tools and the like can be easily manufactured.

Alternatively, paper, plastic resin, aluminum or the like, which has a melting point lower than that of the powder material, may be used for the core, while iron- or copper-based powder may be used for the powder material. Because the core has a melting point lower than that of the powder material, a beam having an energy density lower than that of the beam used to harden the powder material can be used to firmly join neighboring sheet materials, thereby preventing poor adhesion between the sheet materials.

In this case, the core is removed from the plurality of hardened layers, thereby forming a cavity therein. This cavity can be used for, for example, a water or air passage for cooling use. Alternatively, amcolten or fluidic material is filled in the cavity. If copper or aluminum is filled in the hollowed object, the thermal conductivity thereof is increased. Also, a heater or a foaming object can be made by filling the hollowed object with an electric resistance material or concrete, respectively. In addition, a shaped object having heat storage effects can be made by filling a high-polymer resin therein.

Alternatively, the core is made of a conductive material, while the powder material is made of an insulating material.

By this construction, three-dimensional circuits can be simply made within a reduced period of time. Furthermore, a cooling pipe or a heater can be embedded in the hardened layers or in the conductive material.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIGS. 24A and 24B are top plan views of a sheet material having an island formed therein after and before connecting portions have been removed, respectively;

FIGS. 24C and 24D are side views of the sheet materials of FIGS. 24A and 24B, respectively, after they have been laminated;

DETAILED DESCRIPTION OF THE PREFERRED EMBODIMENTS

Figure 1A:
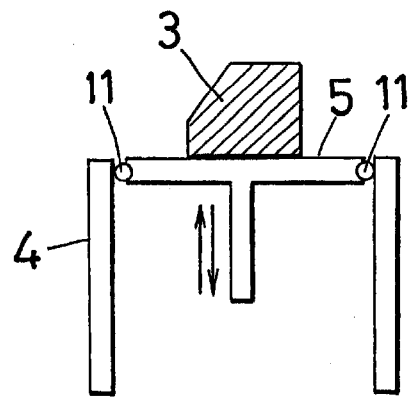
FIGS. 1A to 1E show a method of manufacturing a three-dimensional object according to a first embodiment of the present invention, and are schematic cross-sectional views of the manufacturing process thereof.

This application is based on application No. 11-82309 filed Mar. 25, 1999 in Japan, the content of which is incorporated hereinto by reference.

FIGS. 1A to 1E depict a method of manufacturing a three-dimensional object according to a first embodiment of the present invention, wherein a three-dimensional object is obtained by successively laminating hardened layers 2 of hardened powder material 1. According to this method, a member or core 3 (this member is hereinafter referred to as an embedded member) to be embedded in a target object is first placed on a vertically movable plate 5, and the powder material 1 is then filled up around the embedded member 3. Thereafter, the powder material 1 is hardened in the vicinity of the embedded member 3 so as to be integrated therewith. The filling and hardening of the powder material 1 is repeatedly carried out with a downward movement of the vertically movable plate 5, thereby successively laminating the hardened layers 2.

More specifically, the embedded member 3 is placed on the plate 5 surrounded by a side wall member 4, and the plate 5 is gradually lowered by a length L at one time, which corresponds to the thickness of each hardened layer 2, from an upper edge 6 of the side wall member 4, whereby the powder material 1 is filled or filled and hardened at each lowering of the plate 5 into the space 7 surrounded by the side wall member 4.

Figure 1B:
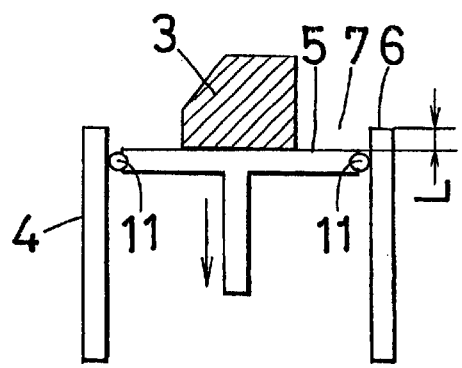
Figure 1C:
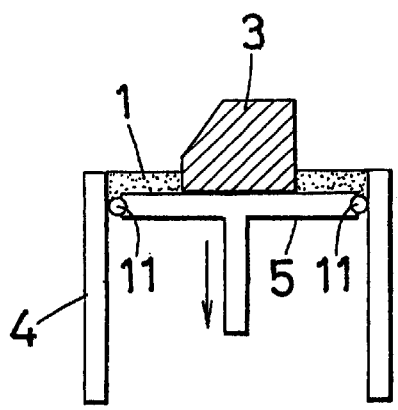

As shown in FIG. 1A, the embedded member 3 is placed in advance on the plate 5, and as shown in FIG. 1B, the plate 5 is lowered by a length L which is equivalent to the thickness of the hardened layers 2. Thereafter, as shown in FIG. 1C, the powder material 1 is filled in the space 7 surrounded by the side wall member 4. A slider 11, which slides in a close contact state with the inner surface of the side wall member 4, is mounted on the outer peripheral surface of the plate 5, and the space 7, from which there is no leak of the powder material 1, is formed at a predetermined depth (dimension L) from the upper edge 6 of the side wall member 4.

Figure 1D:
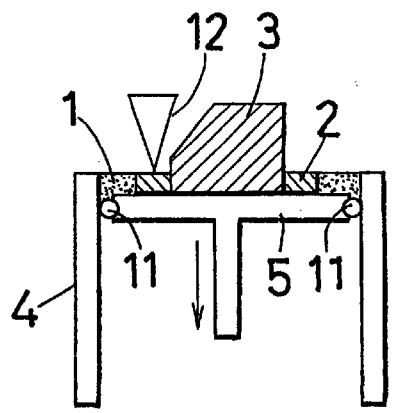

Next, as shown in FIG. 1D, a beam 12 is irradiated to harden the powder material 1 only in the outer region in the proximity of the embedded member 3. At this time, the hardened layer 2 is united with the outer side surface of the embedded member 3. As the beam 12, an optical beam such as a laser or directional energy beam is irradiated, and the powder material 1 is hardened by sintering. The powder material 1 is an organic material such as a resin or an inorganic material such as a metal, and high efficiency, reliable hardening is performed as only the necessary portion is selectively sintered by the above-mentioned beam 12. In addition, it is preferable that, from the fact that the powder material 1 is hardened and united with the embedded member 3, the quality of the embedded member 3 be the same as the powder material 1. However, a separate inexpensive and high strength material may be adopted.

Figure 1E:
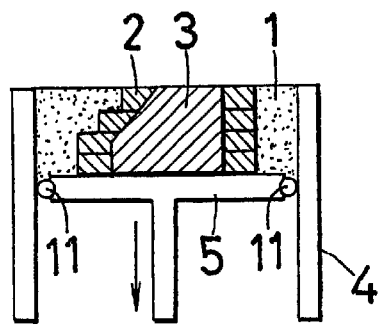
Figure 2A:
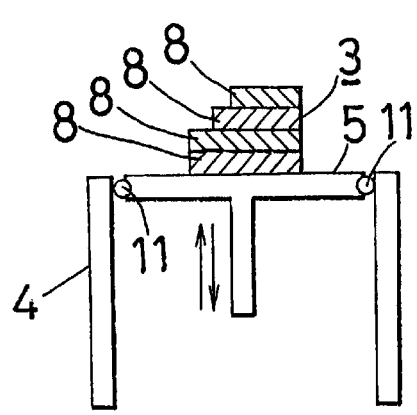
FIGS. 2A to 2E are views similar to FIGS. 1A to 1E, but showing a method of manufacturing a three-dimensional object according to a second embodiment of the present invention.
Figure 2B:
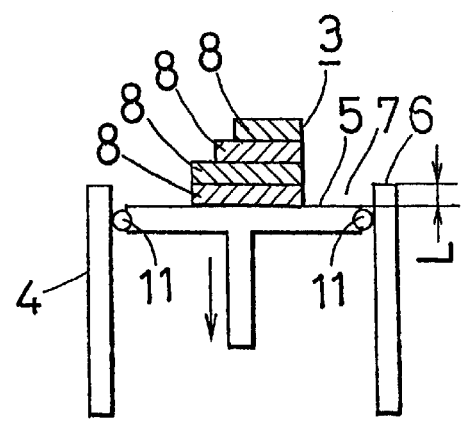
Figure 2C:
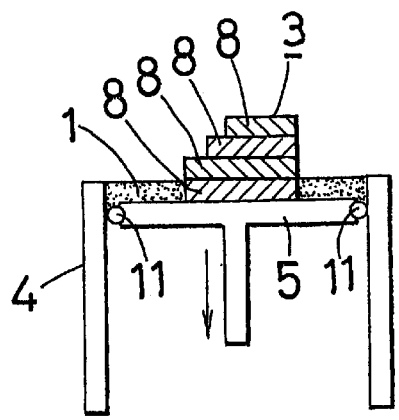
Figure 2D:
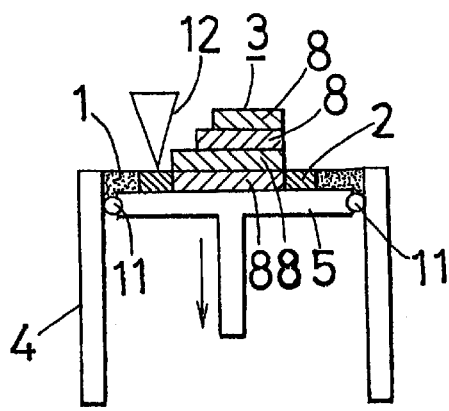
Figure 2E:
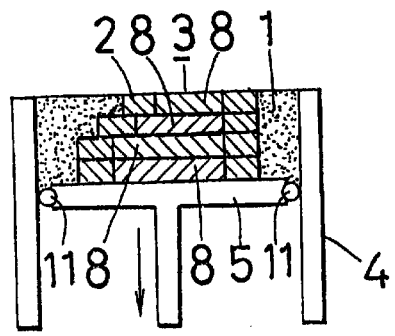
Figure 3A:
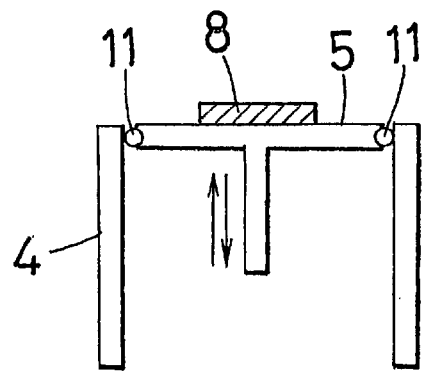
FIGS. 3A to 3E are views similar to FIGS. 1A to 1E, but showing a method of manufacturing a three-dimensional object according to a third embodiment of the present invention.
Figure 3B:
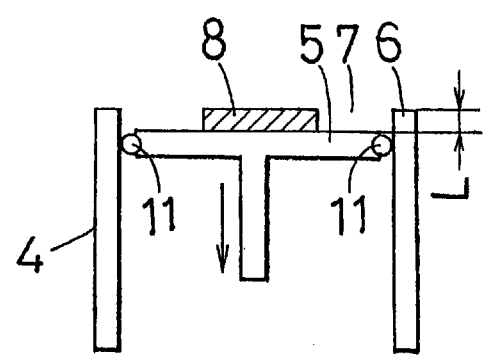
Figure 3C:
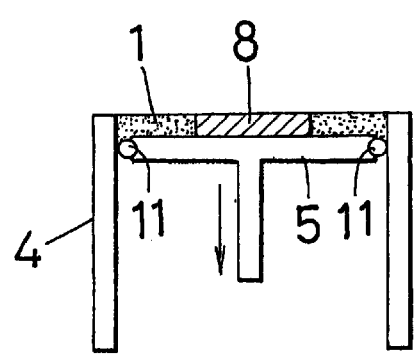
Figure 3D:
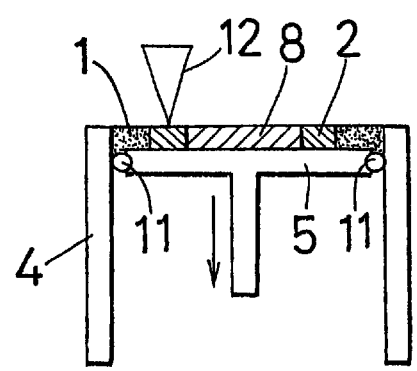
Figure 3E:
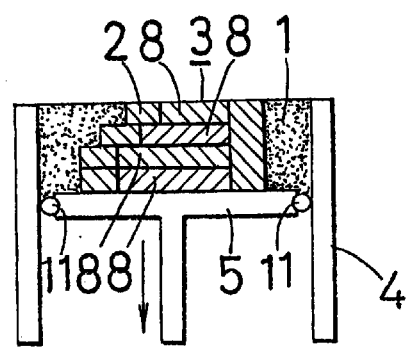

The steps of the above FIGS. 1B to 1D are repeated until, finally, leading to FIG. 1E, the shaped object is completed. In this case, a metal component or metal mold or the like can be manufactured by the hardening and lamination of a metal powder material 1, and a resin component can be manufactured using a resin powder material 1. Also, shaped objects or component parts in which an organic material and inorganic material have been mixed can be manufactured.

Accordingly, by the formation of the firm embedded member 3 at high density, a shaped object of generally high strength can be manufactured. Moreover, only the powder material 1 in the outer region in the proximity of the embedded member 3 need be successively hardened as the layer structure, and at this time, the amount of scanning data in the scanning of the beam 12 to afford the hardening is reduced within the contour lines of the shaped object whereby the scanning time is shortened. Even if the shape is complex, a shortening of the shaping time thereof can be achieved. In addition, by virtue of the fact that the amount of hardened powder material 1 is reduced, deformation due the contractions during the hardening is prevented and a high precision shaped object can be manufactured.

Furthermore, the embedded member 3 is lowered each length L equivalent to the thickness of the hardened layer 2 while the hardened layers 2 are successively laminated therearound, so an optimum manufacturing facility can be formed in which the powder material 1 can be easily filled after each hardening, and the distance setting and so on of the beam 12 to be irradiated thereon is made easy. Because, the plate 5 is lowered each length L from the upper edge 6 of the side wall member 4 equivalent to the thickness of the hardened layer 2, the powder material 1 is filled accurately in an amount appropriate to the length L.

FIGS. 2A to 2E depict a method of manufacturing a three-dimensional object according to a second embodiment of the present invention, wherein a plurality of sheet materials 8 are laminated together to form an embedded member 3. In this case, each sheet material 8 is an inorganic material or an organic material, and after they have been laminated one above another and united together, they are placed on the plate 5.

Accordingly, even if the shape of the target object is complex, it can be manufactured easily by the use of the embedded member 3 embedded therein which is obtained by laminating the sheet materials 8. It is noted that, other than this, the configuration is the same as the embodiment shown in FIGS. 1A to 1E.

FIGS. 3A to 3E depict a method of manufacturing a three-dimensional object according to a third embodiment of the present invention, wherein prior to the formation of each hardened layer 2, a sheet material 8 is placed on the plate 5 or another sheet material 8 to form the embedded member 3. In this case, the sheet materials 8 are cut into a predetermined shape and the thickness dimension thereof is made approximately equal to the dimension L equivalent to the thickness of the hardened layer 2. Although each sheet material 8 is placed on the plate 5 prior to the lowering of the plate 5 by the dimension L, the sheet materials 8 may also be placed on the plate 5 after the plate 5 has been lowered. That is, the steps of FIGS. 3A and 3B may be interchanged.

In this case, because there is no need for the sheet materials 8 to be all laminated and united in advance to form the embedded member 3, the embedded member 3 can be manufactured simply by the successive laminate-arrangement of the sheet materials 8 prior to the formation of the hardened layers 2. The embedded member 3 causes no obstruction to the packing of the powder material 1. Furthermore, the embedded member 3 does not protrude upward from the filled powder material 1 and, hence, it does not cause interference to the hardening operation of the powder material 1 on which the beam 12 is irradiated. It is noted that, other than this, the configuration is the same as the embodiment shown in the above FIGS. 2A to 2E.

Figure 4:
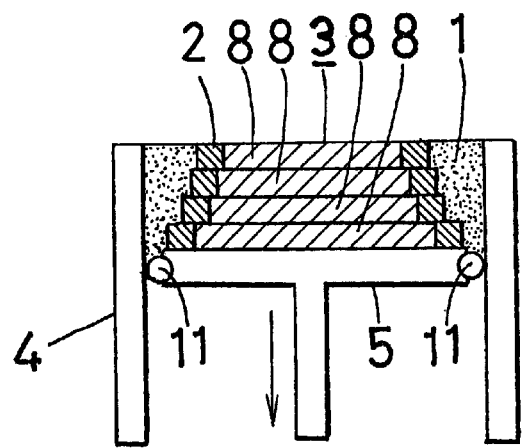
FIG. 4 is a schematic cross-sectional view that illustrates a method of laminating the sheet materials.

In the above-described embodiments, as shown in FIG. 4, the powder material 1 is filled around the sheet materials 8, and no powder material 1 is interposed between the sheet materials 8. In this case, the gaps between the edge surfaces of the sheet materials 8 are plugged and firmly joined together by the hardened layers 2 of powder material 1, thereby preventing bend-distortion of the sheet materials 8 from the edge surfaces. Moreover, because the joined portions are small, the influence by thermal strain or the like is also small, and a high precision shaped structure can be produced.

Figure 5A:
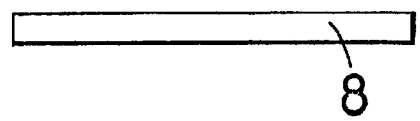
FIGS. 5A to 5D illustrate another method of laminating the sheet materials.
Figure 5B:
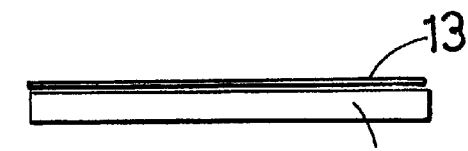
Figure 5C:
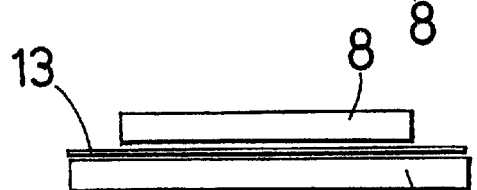
Figure 5D:
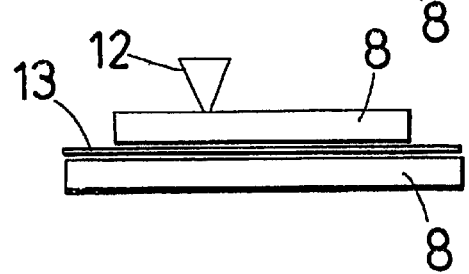

In addition, as shown in FIGS. 5A to 5D, the powder material 1 may be coated and interposed between the sheet materials 8, and by the fusion or sintering of the powder material 1 between the sheet materials 8, the sheet materials 8 can be joined to each other. In this case, as shown in FIGS. 5A and 5B, the powder material 1 is first coated on the surface of the bottom layer of the sheet materials 8 to form a joining powder layer 13. As shown in FIG. 5C, an upper layer of the sheet material 8 is then placed on the joining powder layer 13, and as shown in FIG. 5D, a beam 12 such as a laser is irradiated to the joining powder layer 13 through the upper layer sheet materials 8 from above. By so doing, the joining powder layer 13 is fused or sintered to join the upper and lower layers of the sheet materials 8.

In this case, the joining strength between the sheet materials 8 is enhanced to increase the mechanical strength of the shaped object. If powder material 1 of lower melting point than the sheet materials 8 is employed, the shaping can be performed without damage being caused due to the heat effects of the beam 12 on the sheet materials 8. Accordingly, a high precision shaped object, in which no deformation or distortion is produced in the sheet materials 8, is obtained.

Figure 6A:
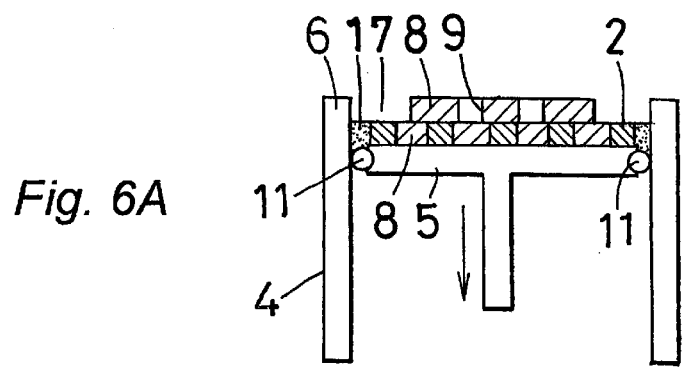
FIGS. 6A to 6D are views similar to FIGS. 1A to 1E, but showing a method of manufacturing a three-dimensional object according to a fourth embodiment of the present invention.
Figure 6B:
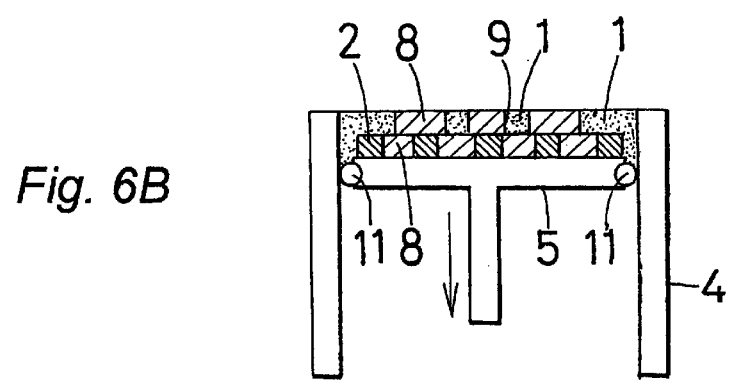
Figure 6C:
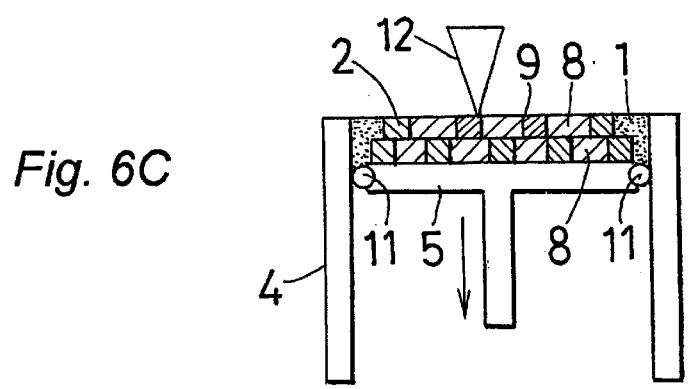

FIGS. 6A to 6D depict a method of manufacturing a three-dimensional object according to a fourth embodiment of the present invention, wherein the powder material 1 is filled into through-holes 9 provided in each of the laminated sheet materials 8, and the sheet materials 8 are united together by hardening the powder material 1. In this case, as shown in FIGS. 6A and 6B, from above the sheet materials 8 having a plurality of through-holes 9 defined therein, the powder material 1 is filled around the sheet materials 8 and also in the through-holes 9, and as shown in FIG. 6C, a beam 12 such as a laser is irradiated from above the sheet materials 8 to harden the powder materials 1 filled around the sheet materials 8 and in the through-holes 9. The steps of FIGS.

Figure 6D:
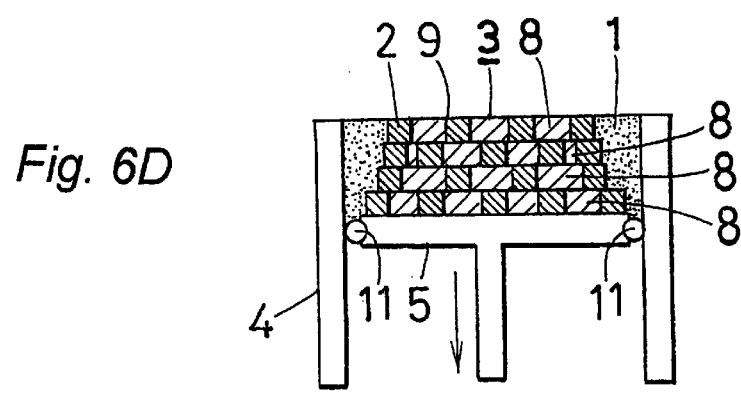

6A to 6C are repeated until, finally, leading to FIG. 6D, the shaped object is completed.

Because the sheet materials 8 are joined by the hardening of the powder material 1 filled in the through-holes 9, the joining strength between the sheet materials 8 is increased, and the distortion of the sheet materials 8 due to the heat effects during hardening of the powder material 1 is prevented, making it possible to provide a high strength and high precision shaped object. It is to be noted that, other than this, the configuration is the same as the embodiment shown in FIGS. 3A to 3E.

Figure 7:
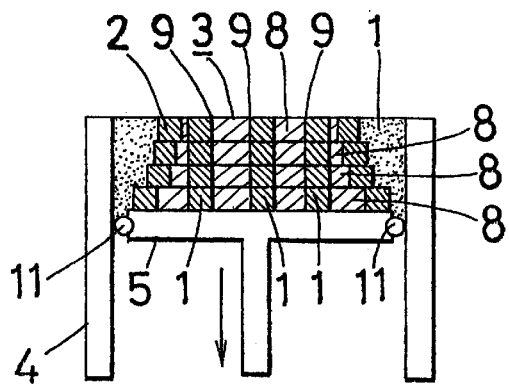
FIG. 7 shows a method of manufacturing a three-dimensional object according to a fifth embodiment of the present invention, and is a schematic cross-sectional view of the manufacturing process thereof.

FIG. 7 depicts a method of manufacturing a three-dimensional object according to a fifth embodiment of the present invention, wherein the through-holes 9 extend across the sheet materials 8. In this case, the through-holes 9 extending through all the sheet materials 8 are formed at a plurality of positions.

In this case, because the sheet materials 8 are joined together by the hardening of the powder materials 1 filled in the through-holes 9 that extend completely across the sheet materials 8, the sheet materials 8 are accurately positioned with each other and Joined together without lateral offsetting, making it possible to further increase the accuracy and strength of the shaped object. It is noted that, other than this, the configuration is the same as the embodiment shown in FIGS. 6A to 6D.

Figure 8A:
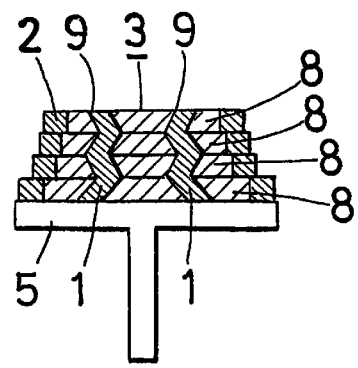
FIGS. 8A and 8B are schematic cross-sectional views of different lamination modes of the sheet materials.
Figure 8B:
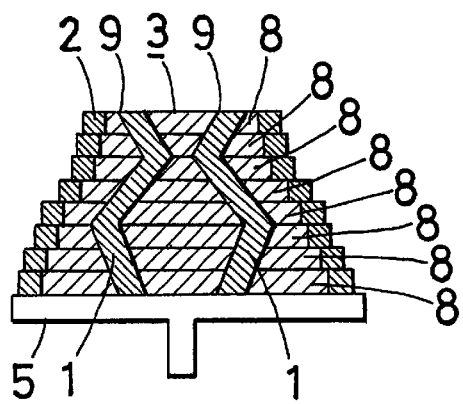

As shown in FIGS. 8A and 8B, the through-holes 9 may be inclined. More specifically, as shown in FIG. 8A, the through-holes 9 at each layer of the sheet materials 8 may be inclined in alternating and different directions, or as shown in FIG. 8B, the through-holes 9 at a plurality of layers of sheet materials 8 may be inclined in alternating and different directions. In this case, in the direction in which the sheet materials 8 are overlapped, the sheet materials 8 are difficult to be separated from each other, further enhancing the strength of the shaped object.

Figure 9:
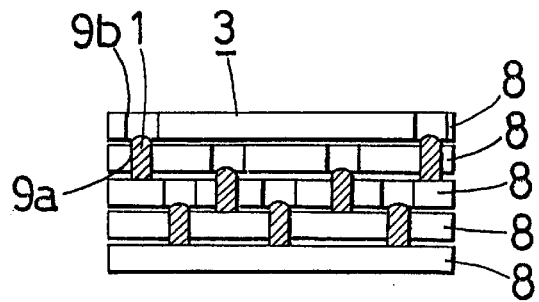
FIG. 9 is a schematic cross-sectional view of another lamination mode of the sheet materials.

In addition, as shown in FIG. 9, of two through-holes 9 extending through two neighboring layers of the sheet materials 8, the upper side through-hole 9b may be used as an escape hole for the powder material 1 filled and hardened in the lower side through-hole 9a. In this case, when the powdered material 1 filled in the lower side through-hole 9a is hardened, because a rising distortion due to the condensation of said powder material 1 escapes through and is absorbed by the upper side through-hole 9b, the adhesive properties between the sheet materials 8 can be improved.

Figure 10:
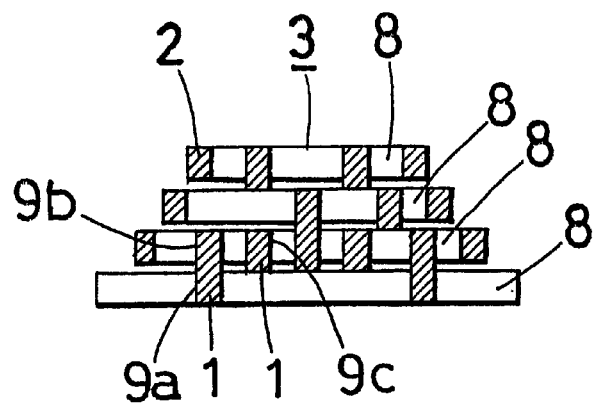
FIG. 10 is a schematic cross-sectional view of a further lamination mode of the sheet materials.

As shown in FIG. 10, the two neighboring sheet materials 8 may have through-holes 9c which do not communicate with the through-holes 9a and through-holes 9b which communicate with the through-holes 9a. In this case, the positioning can be performed across the sheet materials 8 using both the through-holes 9b, 9a which communicate with each other, while the adhesive strength between the sheet materials 8 can be increased by the through-holes 9c which do not communicate with the through-holes 9a.

Figure 11:
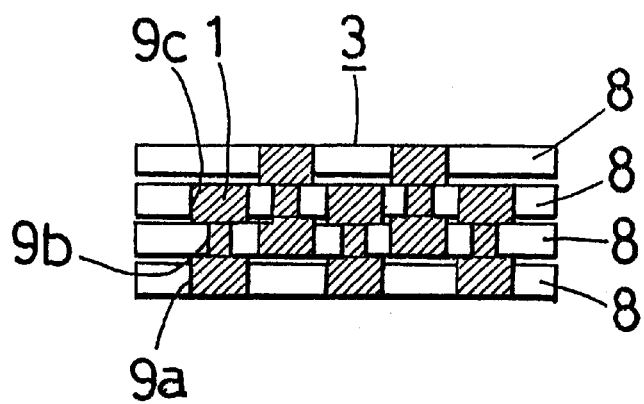
FIG. 11 is a schematic cross-sectional view of a still further lamination mode of the sheet materials.
Figure 12:
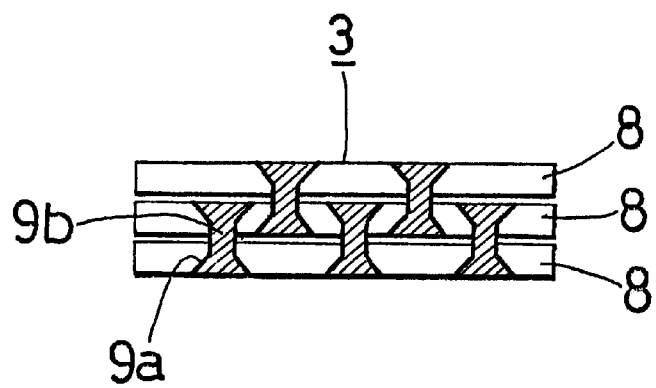
FIG. 12 is a schematic cross-sectional view of a yet further lamination mode of the sheet materials.

Alternatively, as shown in FIG. 11, the hole diameter of the through-holes 9 extending through the sheet materials 8 may be different across the layers of the sheet materials 8. In this case, the upper and lower through-holes 9c, 9a are formed with large diameters, while the medial through-hole 9b is formed with a small diameter. In addition, as shown in FIG. 12, chamfering may be performed on respective opening edges of the through-holes 9b, 9a extending across both the upper and lower layer sheet materials 8. In such cases, in the direction of overlapping of the sheet materials 8, it is difficult for the sheet materials 8 to be separated from each other, making it possible to further increase the adhesion strength across the sheet materials 8.

Figure 13A:
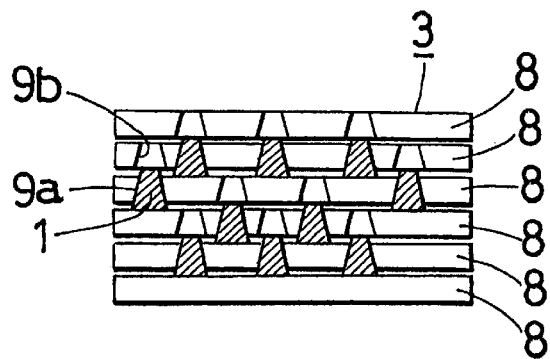
FIGS. 13A to 13C are schematic cross-sectional views of further lamination modes of the sheet materials.
Figure 13B:
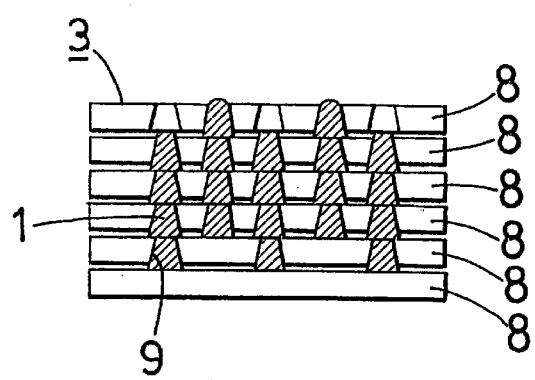
Figure 13C:
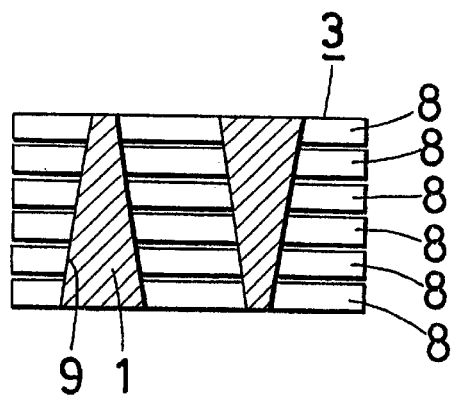

Furthermore, as shown in FIGS. 13A to 13C, the through-holes 9 may be tapered. More specifically, as shown in FIG. 13A, the lower side through-hole 9a in which the powder material 1 is filled and hardened, and the upper side through-hole 9b which forms an escape hole, may be formed into the same tapered holes having the same inclination and the same size. Alternatively, as shown in FIG. 13B, the through-holes 9 extending across a large number of layers may be formed into the same tapered holes having the same inclination and the same size. Again alternatively, as shown in FIG. 13C, the through-holes 9 extending across a large number of layers may be formed into a tapered hole having a continuous side surface by the successive alteration of the size thereof. Of a plurality of through-holes 9, the direction of taper of some of them may be reversed with respect to that of others. In such cases, in the overlapping direction of the sheet materials 8, the sheet materials 8 are difficult to be separated from each other, and the adhesive strength between the sheet materials 8 can be enhanced. Also, the positioning is facilitated.

Figure 14:
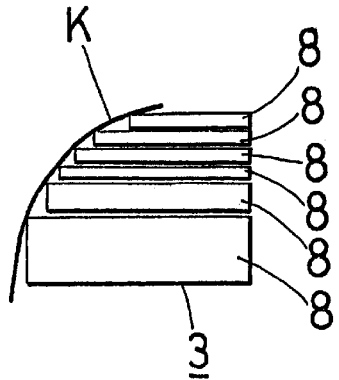
FIG. 14 shows a method of manufacturing a three-dimensional object according to a sixth embodiment of the present invention, and is a schematic cross-sectional view of the manufacturing process thereof.
Figure 15A:
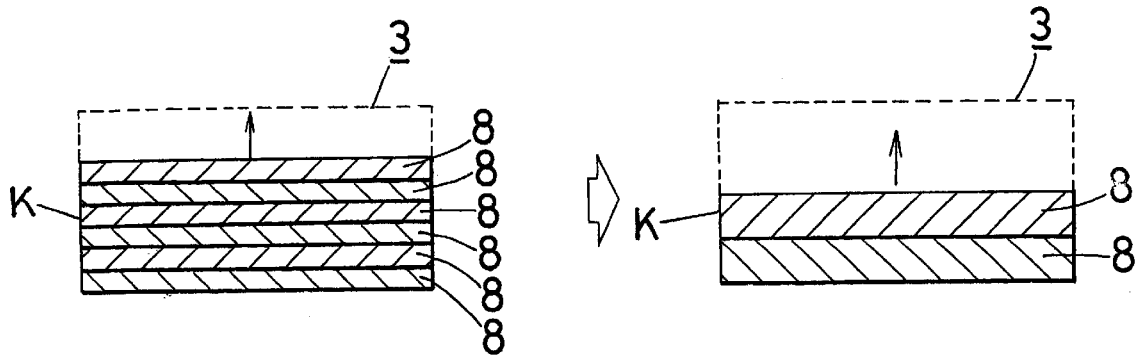
FIGS. 15A and 15B are schematic cross-sectional views of the sheet materials, and illustrate different lamination mode thereof.
Figure 15B:
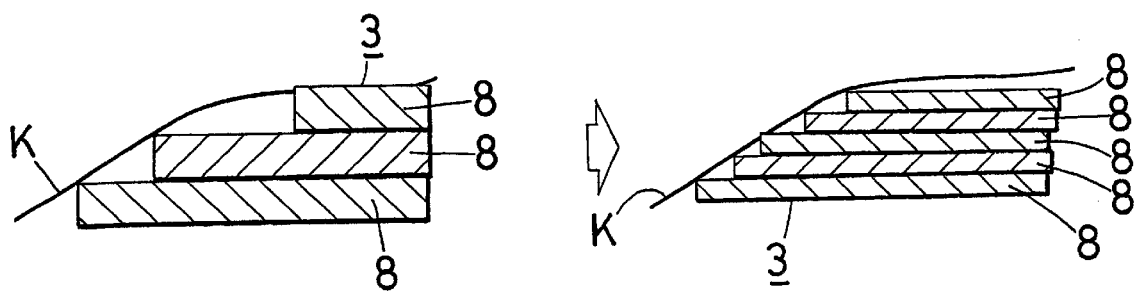

FIG. 14 depicts a method of manufacturing a three-dimensional object according to a sixth embodiment of the present invention, wherein the thickness of the sheet materials 8 are altered and set so as to be thick at positions where the inclination K of the outer side surface of the embedded member 3 is steep (the positions where the inclination K approaches the vertical direction) and to be thin at positions where the inclination K is gentle (the positions where the inclination K approaches the horizontal direction). In this case, as shown in FIG. 15A, the sheet materials 8 are made thick at the positions where the inclination K is close to the vertical direction, and the number of lamination is reduced, making it possible to reduce the shaping time. In contrast, as shown in FIG. 15B, the sheet materials 8 are made thin at the positions where the inclination K is close to the horizontal direction, and the level difference generated at the edges thereof is made smaller, making it possible to smoothly finish the surface of the shaped object.

Figure 16A:
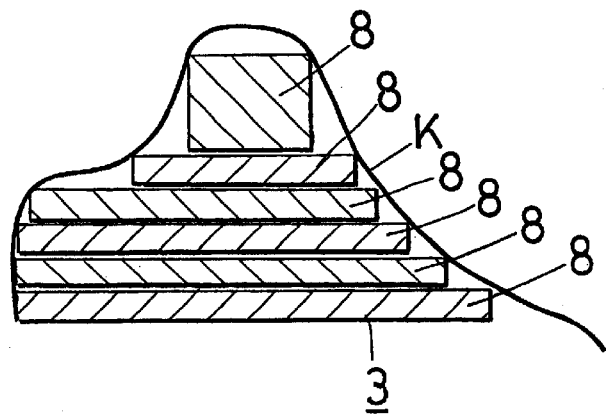
FIGS. 16A and 16B are schematic cross-sectional views of the sheet materials, and illustrate further different modes thereof.
Figure 16B:
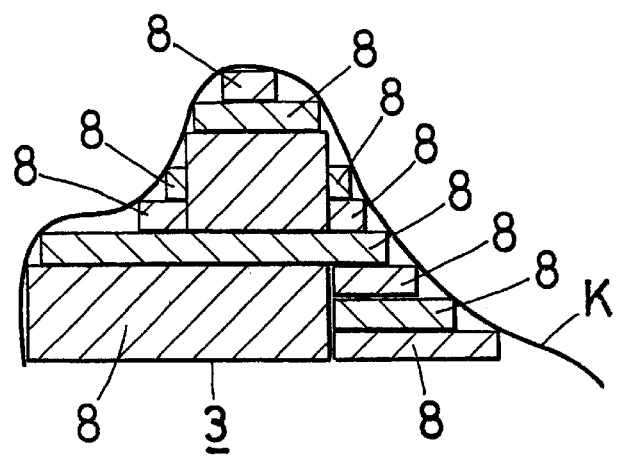

Moreover, as shown in FIG. 16A, the sheet materials 8 may be integrally formed at each layer and the thickness thereof may be made uniform, while as shown in FIG. 16B, a plurality of layers of the sheet materials 8 may be integrally formed at specific positions, and the thickness thereof may be made different. It is noted that, other than this, the configuration is the same as the embodiment shown in FIGS. 3A to 3E and, hence, the same effects are afforded.

Figure 17:
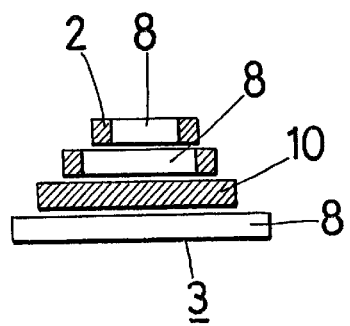
FIG. 17 shows a method of manufacturing a three-dimensional object according to a seventh embodiment of the present invention, and is a schematic cross-sectional view of the manufacturing process thereof.

FIG. 17 depicts a method of manufacturing a three-dimensional object according to a seventh embodiment of the present invention, wherein solidified powder layers 10 are interposed between the sheet materials 8. In this case, the solidified powder layers 10 are placed in place of the sheet materials 8, and a firm joining of the upper and lower sides of the sheet materials 8 is afforded.

Accordingly, even if the shape of the laminated surface of the sheet materials 8 is finely complex, by way of example, even if the cut-away shape is complex and independent contour lines of islands are generated in large number, the solidified powder layers 10 are selectively or appropriately formed in place of the sheet materials 8, facilitating the manufacture of a complicated object.

Figure 18:
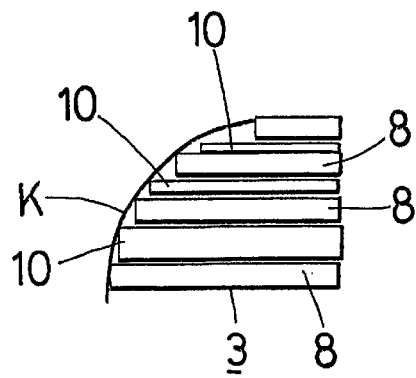
FIG. 18 is a schematic cross-sectional view of another lamination mode of the sheet materials.

As shown in FIG. 18, a plurality of solidified powder layers 10 having different thickness may be formed. In this case, in order to obtain the solidified powder layers 10, it is sufficient if the coating and hardening of the powder material 1 is simply repeated a plurality of times, which is easier than altering the thickness of the sheet materials 8, and no special mechanism or device is required. It is to be noted that, other than this, the configuration is the same as the embodiment shown in FIGS. 3A to 3E.

Figure 19:
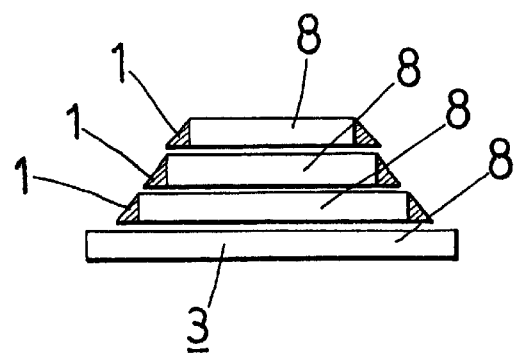
FIG. 19 shows a method of manufacturing a three-dimensional object according to an eighth embodiment of the present invention, and is a schematic cross-sectional view of the manufacturing process thereof.
Figure 20A:
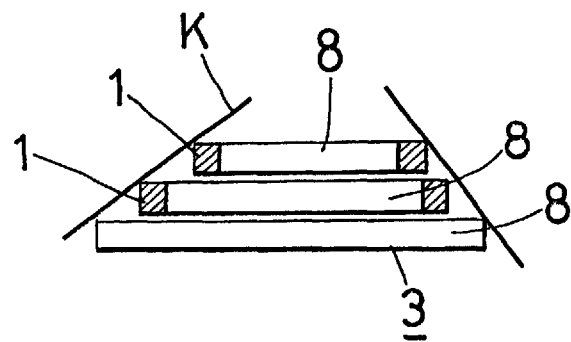
FIGS. 20A to 20C are schematic cross-sectional views of a comparative lamination mode of the sheet materials.
Figure 20B:
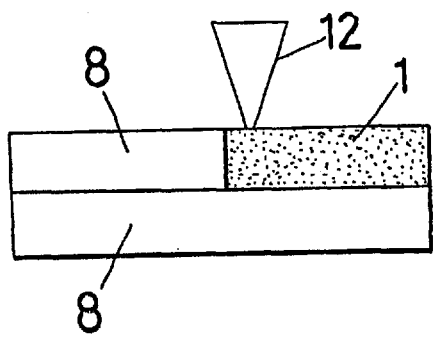
Figure 20C:
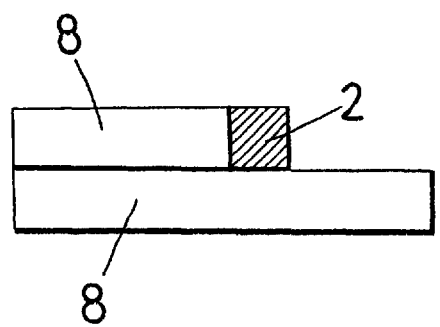
Figure 21A:
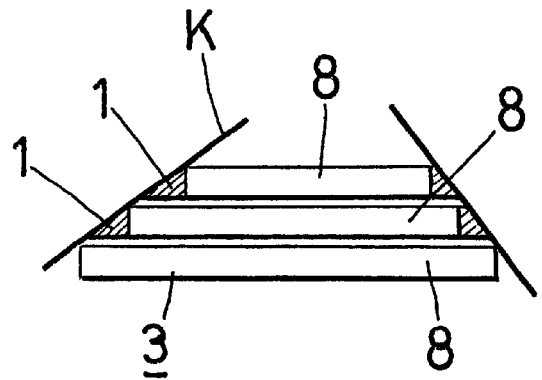
FIGS. 21A to 21C are schematic cross-sectional views of the lamination mode of the sheet materials in the method of FIG. 19.
Figure 21B:
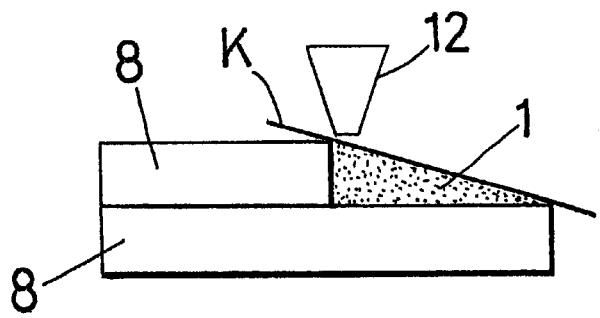
Figure 21C:
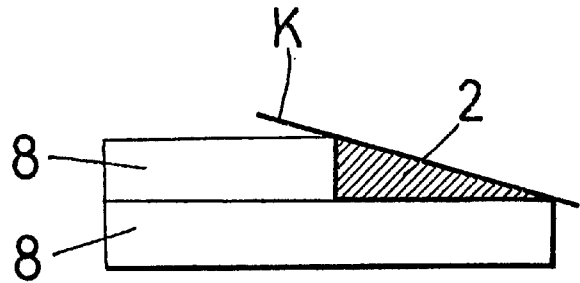

FIG. 19 depicts a method of manufacturing a three-dimensional object according to an eighth embodiment of the present invention, wherein when the embedded member 3 has stepped portions on the outer side surfaces of the sheet materials 8, the powder material 1 is filled and hardened in recesses of the stepped shape such that the upper surface thereof may form a tapered shape along the inclination of the steps. Although in the case of FIGS. 21A to 21C the level difference is relatively large, it can be reduced along the inclination K of the steps, as shown in FIGS. 21A to 21C. Here, FIGS. 20A and 21A depict the entire shape, FIGS. 20B and 21B depict the state in which the beam 12 is irradiated to harden the powder material 1, and FIGS. 20C and 21C depict the hardened layer 2 in which the powder material 1 has been hardened.

In this case, the stepped outer side surface of the embedded member 3 is formed into a tapered shape which approximates the inclination K by hardening the powder material 1 filled in the recesses of the stepped portions, making it possible to smoothly finish the surface of a shaped object. Moreover, when polishing is carried out, the amount to be shaved or removed, thus shortening the finishing time.

Figure 22A:
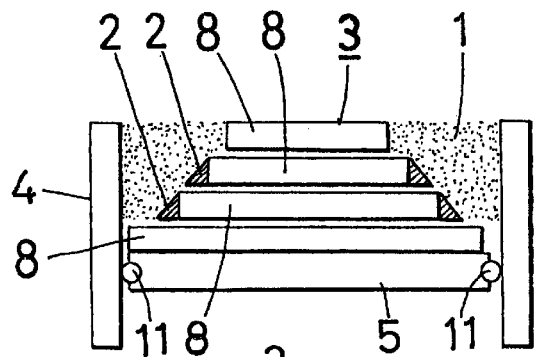
FIGS. 22A to 22C are schematic cross-sectional views of the sheet materials, particularly illustrating the filling and hardening processes of the powder material.
Figure 22B:
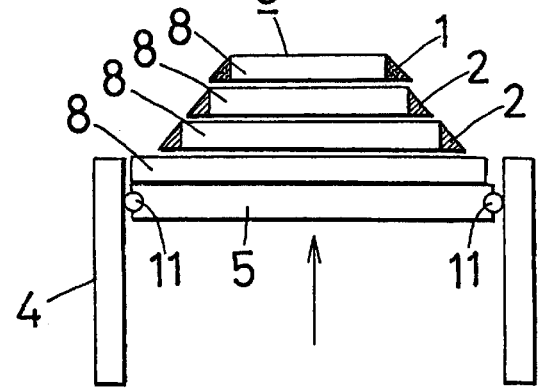
Figure 22C:
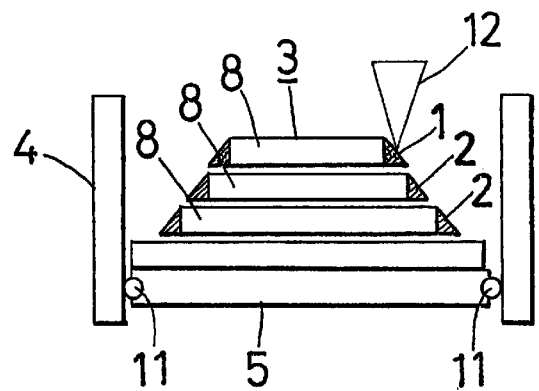

An exciter can be effectively utilized to form the upper surface of the powder material 1, which have been filled into the recesses of the stepped portions, into a tapered shape. By way of example, as shown in FIGS. 22A and 22B, following packing of the powder material 1, the plate 5 is raised and vibration is imparted thereto, and the non-required powder material 1 is shaken off whereby the upper surface thereof can be formed into the tapered shape. In this case, as shown in FIG. 22A, in a state in which the plate 5 is lowered to a predetermined position, the powder material 1 is filled into the space 7 surrounded by the side wall member 4, and next, as shown in FIG. 22B, the plate 5 is raised to the highest position and vibrated so that the non-required powder material 1 is shaken off and the upper surface of the powder material 1 is formed into a tapered shape. Thereafter, as shown in FIG. 22C, the plate 5 is lowered to a predetermined position, and in this state, a beam 12 is irradiated to the powder material 1 around the sheet materials 8 to form the hardened layers 2. It is noted that, other than this, the configuration is the same as the embodiment shown in FIGS. 3A to 3E.

According to the present invention, by irradiation of an optical beam such as a laser or directional energy beam, the powder material 1 is hardened by sintering and the sheet materials 8 are cut into a predetermined shape. By adopting the optical beam in this way, localized pin-point hardening can be performed without imparting the undesirable effects on the sheet materials 8 due to heat. Furthermore, the optical beam can be scanned accurately and freely to match the contour line shape.

Figure 23:
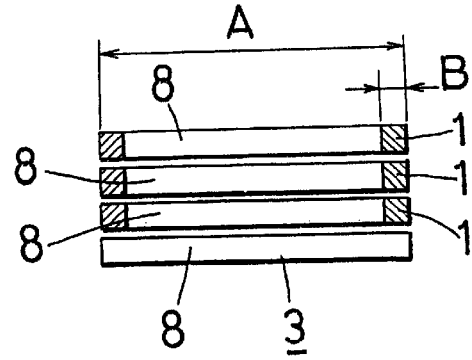
FIG. 23 is a schematic cross-sectional view of another lamination mode of the sheet materials.

In addition, when a box-shaped object is manufactured, as shown in FIG. 23, the sheet materials 8 are cut in such a way that a space, in which the powder material 1 is filled, may be formed at the edge portion of each sheet material 8. That is, the lowest layer of sheet materials 8 may be a shape which matches the shaped object (required dimension A), but other sheet materials 8 are cut slightly smaller such that a space (packing part dimension B) is secured, taking into account the amount of the powder material 1 filled in the edge portion thereof. In this case, the edge portions of the sheet materials 8 are firmly joined together, and a shaped object which constitutes the predetermined box shape having the required dimension A can be obtained with a high degree of precision.

As shown in FIGS. 24A to 24D, if an independent region or an island 14 having an independent contour line is present in the laminated surface of the sheet materials 8, the sheet materials 8 are cut and formed into a shape having connecting portions 15 for connecting the island 14 with a major portion. In this case, after the laminating of the sheet materials 8, or after the completion of the manufacturing of the shaped object, the connecting portions 15 are cut and removed, as shown in FIGS. 24A and 24D. As a result, when the cut sheet materials 8 are transported, because the island 14 is integrated with the major portion by the connecting portions 15, as shown in FIG. 24B, the transportation is easy. In addition, as shown in FIG. 24C, when the sheet materials 8 are laminated, the positioning can be easily performed by virtue of the integrated structure of the island 14 with the major portion.

Figure 25A:
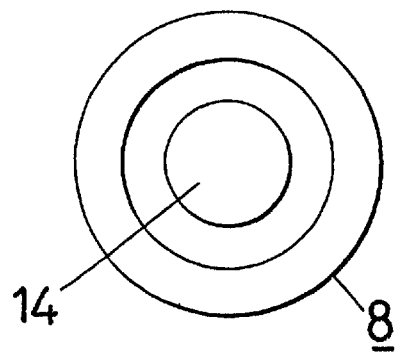
FIG. 25A, FIG. 25B and FIG. 25C are top plan views of a different sheet material after and before connecting portions have been removed, and during the positioning of the sheet material, respectively.
Figure 25B:
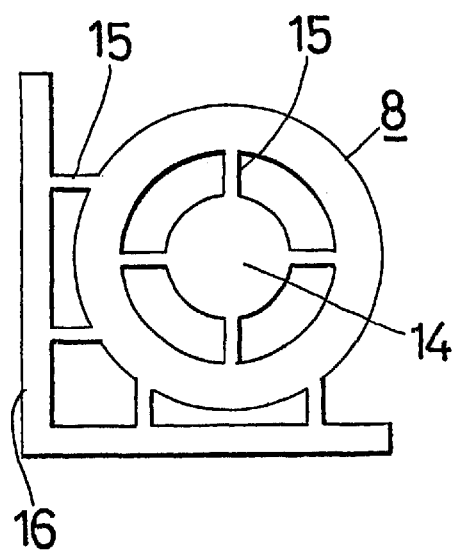
Figure 25C:
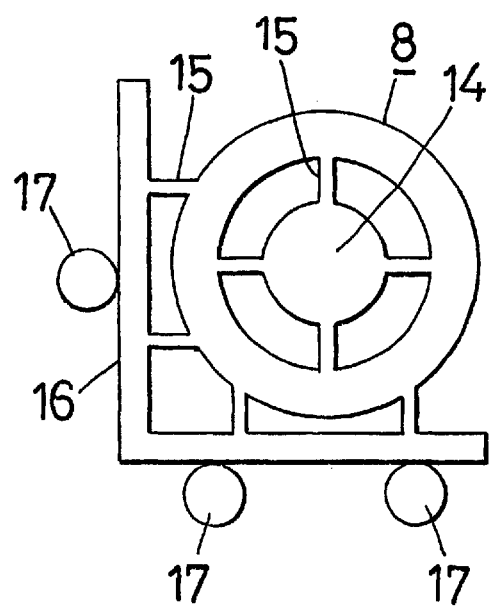

As shown in FIGS. 25B to 25C, the sheet materials 8 may be cut into a shape having positioning side pieces 16 integrally formed therewith. With this configuration, the positioning of the sheet materials 8 can be easily performed by bringing the positioning side pieces 16 into contact with positioning pins 17. In this case, as shown in FIG. 25B, the positioning side pieces 16, which meet at right angles to each other, together with the island 14 are connected with the major portion via the connecting portions 15, and as shown in FIG. 25C, the sheet materials 8 are appropriately positioned by bringing the two positioning side pieces 16 into contact with at least three positioning pins 17 for subsequent lamination and joining. Finally, as shown in FIG. 25A, all the connecting portions 15 and the positioning side pieces 16 are cut and removed. It is to be noted that the positioning pins 17 are mounted on the plate 5 so as to protrude therefrom, for example.

Figure 26A:
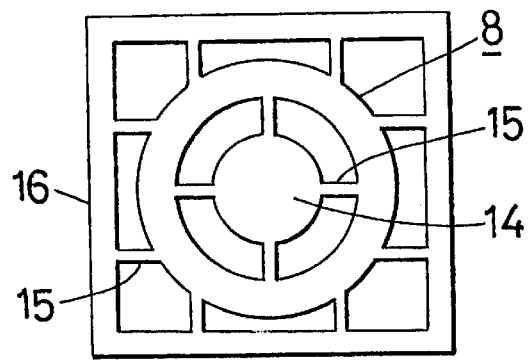
FIG. 26A is a top plan view of a further sheet material.
Figure 26B:
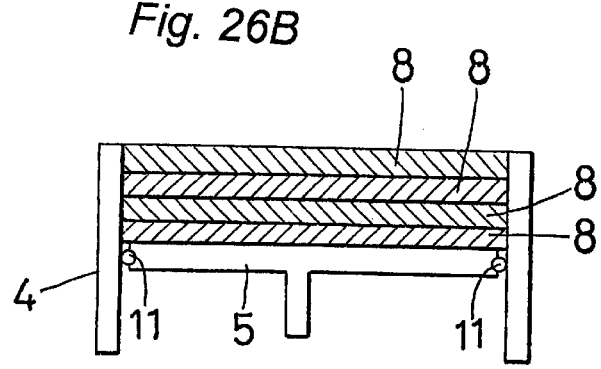
FIG. 26B is an schematic cross-sectional view of the sheet materials of FIG. 26A during positioning thereof.

The positioning of the sheet materials 8 may be performed in a manner as shown in FIGS. 26A and 26B. More specifically, the sheet materials 8 are cut into a shape having positioning side pieces 16 in the entire circumference thereof, and The positioning of the sheet materials 8 is performed by bringing the positioning side pieces 16 into contact with inner wall surfaces of the side wall member 4. The sheet materials shown in FIG. 26A have four positioning side pieces 16 surrounding a major portion, and an island 14, both connected with the major portion via a plurality of connecting portions 15. Before the sheet materials 8 are laminated and joined together, they are appropriately positioned by bringing the outer side edges of the positioning side pieces 16 into contact with the inner wall surfaces of the side wall member 4, as shown in FIG. 26B. It is to be noted that all the connecting portions 15 and the positioning side pieces 16 are cut and removed.

When the positioning of the sheet materials 8 is performed in a manner as shown in FIGS. 25A to 25C or in FIGS. 26A and 26B, the positioning operation is easy. Also, the region which is to be filled with the powder material 1 is made smaller and, hence, the amount of the power material 1 can be reduced. As a result, a shaped object with a high degree of precision can be obtained.

Figure 27A:
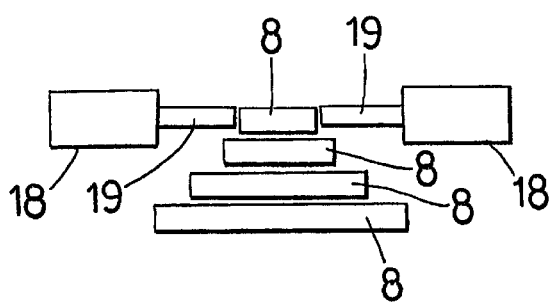
FIGS. 27A and 27B are schematic cross-sectional views of different sheet materials during positioning thereof.
Figure 27B:
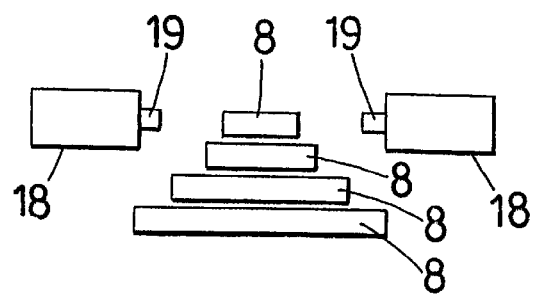

As shown in FIGS. 27A and 27B, the positioning of the sheet materials 8 can be performed using pusher drivers 18 each having a pusher 19. During positioning, the pushers 19, which are caused to advance and retreat by the pusher drivers 18, are held in contact with the outer edges of a sheet material 8. Here, FIG. 27A shows the state during positioning, and FIG. 27B shows the positioning-released state.

Figure 28A:
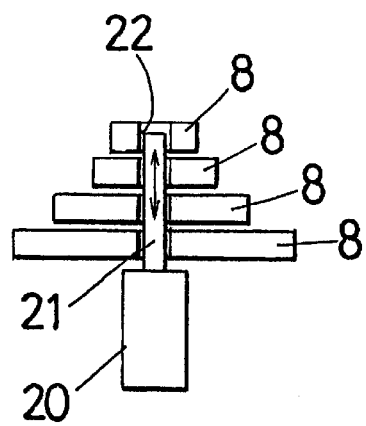
FIGS. 28A and 28B are schematic cross-sectional views of further different sheet materials during positioning thereof.
Figure 28B:
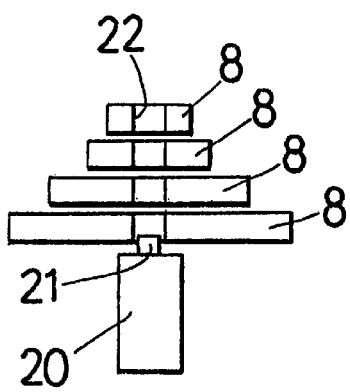

As shown in FIGS. 28A and 28B, the positioning of the sheet materials 8 can be performed by inserting a movable pin 21, which is caused to advance and retreat by a pin driver 20, into positioning holes 22 defined in the sheet materials 8. Here, FIG. 28A shows the state during positioning, and FIG. 28B shows the positioning-released state. When the sheet materials 8 are positioned in this way, the optical beam irradiation is scanned accurately along the contour lines of the sheet materials 8, and good adhesion between the sheet materials 8 is carried out to enhance the adhesion strength and improve the precision of the shaped object.

Figure 29A:
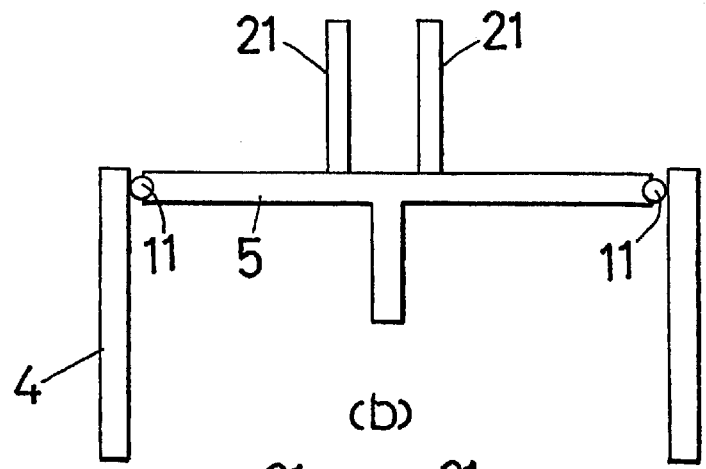
FIGS. 29A to 29C are schematic cross-sectional views of another positioning process.
Figure 29B:
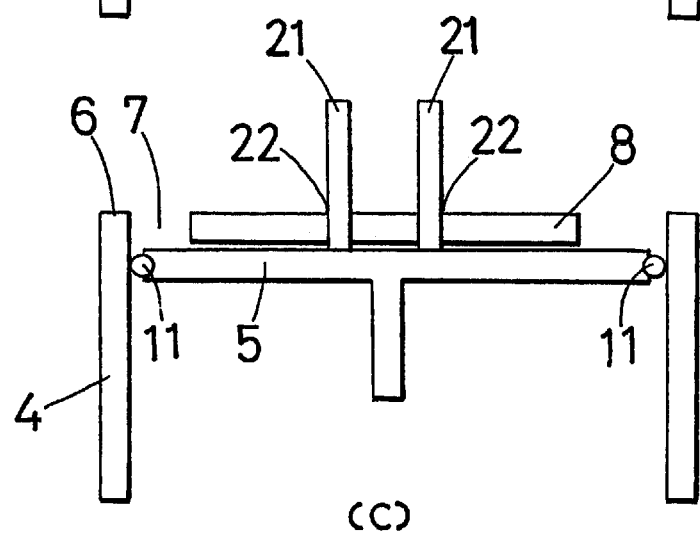
Figure 29C:
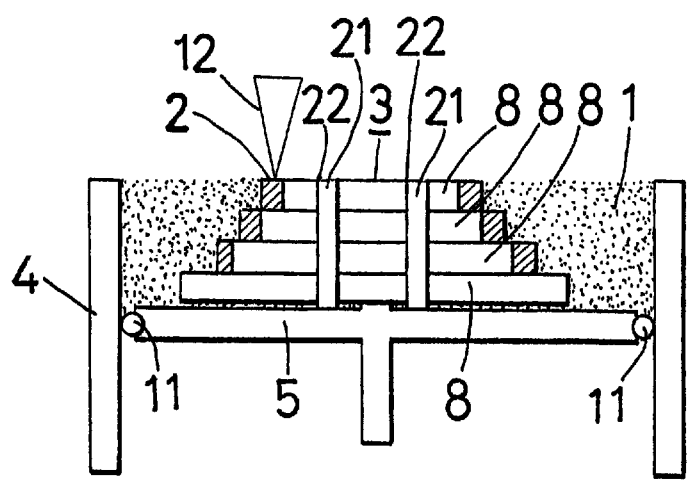

As shown in FIGS. 29A to 29C, the positioning of the sheet materials 8 may be performed by inserting movable pins 21, which are mounted on the vertically movable plate 5 for movement together therewith, into the positioning holes 22 provided in the sheet materials 8. In this case, while the positioning of the sheet materials 8 is being performed easily, the steps shown in FIGS. 29A and 29B and the step of irradiating the beam 12 on the powder material 1 to form the hardened layers 2 are repeated until, finally, leading to FIG. 29C, the shaped object is completed. The movable pins 21 are kept embedded in the shaped object as part of the embedded member 3.

Figure 30:
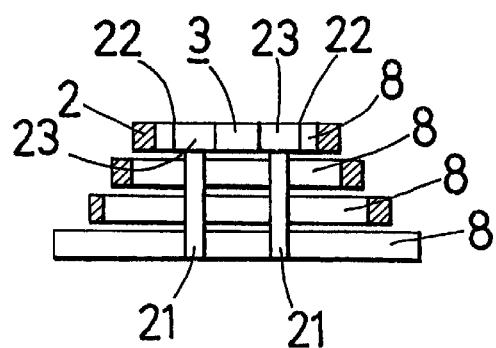
FIG. 30 is a schematic cross-sectional view of further different sheet materials during positioning thereof.

As shown in FIG. 30, ends of the movable pins 21 may be caulked (expanded portions 23).

Figure 31A:
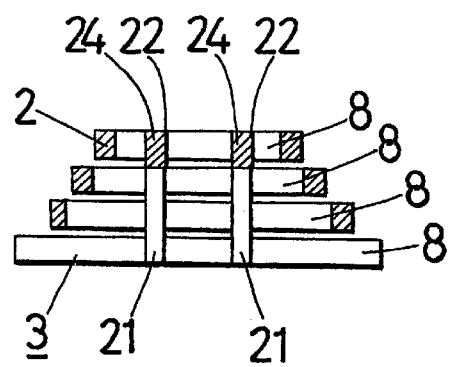
FIGS. 31A and 31B are schematic cross-sectional views of still further different sheet materials during positioning thereof.
Figure 31B:
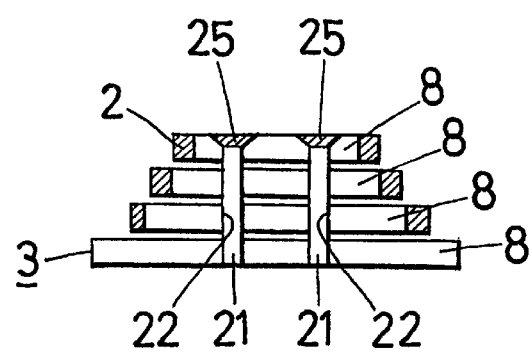

Alternatively, as shown in FIG. 31A, the powder material 1 is filled into the positioning holes 22 of the uppermost sheet material 8, and is hardened to be united with the ends of the movable pins 21 (hardened portions 24). In this case, as shown in FIG. 31B, the positioning holes 22 of the uppermost sheet material 8 may be chamfered (chamfered portions 25). By so doing, it is difficult for the sheet materials 8 to be separated from the movable pins 21, thus increasing the strength in the laminate direction of the sheet materials 8.

Figure 32A:
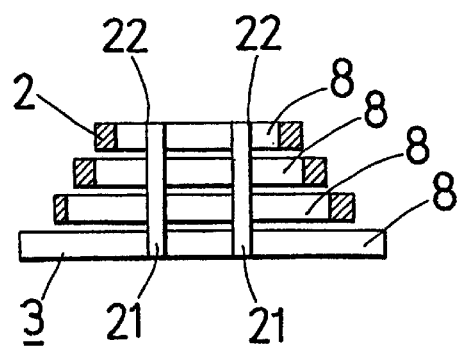
FIGS. 32A and 32B are schematic cross-sectional views of yet further different sheet materials during positioning thereof.
Figure 32B:
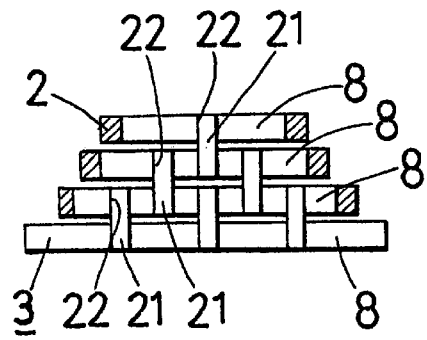

When the positioning of the sheet materials 8 is performed by the insertion of the movable pins 21 into the positioning holes 22 provided in the sheet materials 8, the movable pins 21 may be inserted into all the sheet materials 8, as shown in FIG. 32A, or each of a plurality of movable pins 21 may be inserted in only two neighboring (upper and lower) sheet materials 8, as shown in FIG. 32B.

As shown in FIGS. 33A to 33F, the movable pins 21 may be formed on the lower layer sheet material 8 so as to protrude therefrom.

Figure 33A:
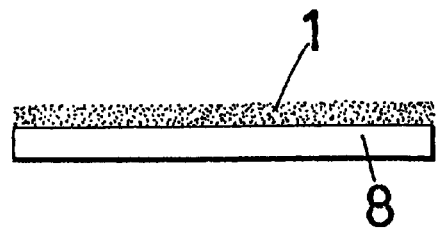
FIGS. 33A to 33F are schematic cross-sectional views of another sheet material explanatory of the positioning thereof.
Figure 33B:
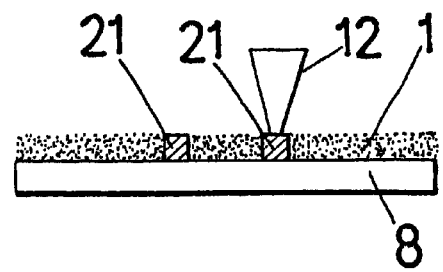
Figure 33C:
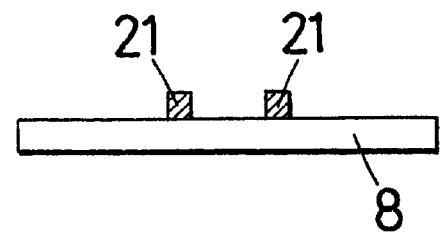
Figure 33D:
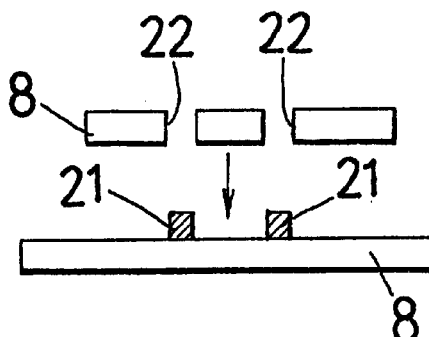
Figure 33E:
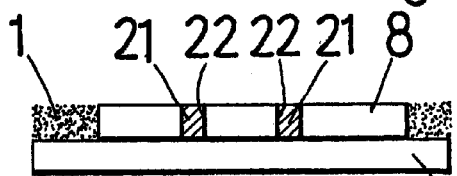
Figure 33F:
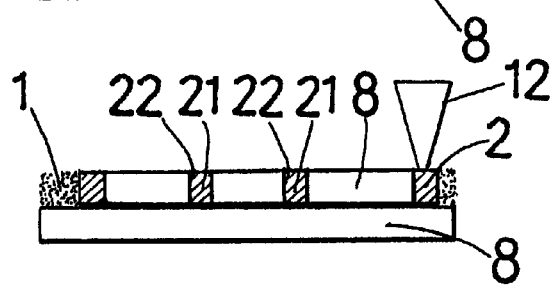

More specifically, as shown in FIG. 33A, the powder material 1 is first coated on the upper surface of a sheet material 8, and as shown in FIG. 33B, a spot-shaped beam 12 is then irradiated selectively on the powder material 1 to effect the hardening thereof to form the movable pins 21. Thereafter, as shown in FIG. 33C, the powder material 1 which remains unhardened is removed, and the movable pins 21 are caused to protrude from the upper surface of the sheet material 8, and as shown in FIG. 33D, another sheet material 8 is placed and appropriately positioned on the lower layer sheet material 8 by inserting the movable pins 21 into the positioning holes 22 in the upper layer sheet material 8. Then, as shown in FIGS. 33E and 33F, a separate powder material 1 is filled, and a beam 12 is irradiated on the powder material 1 around the upper layer sheet material 8 to form a hardened layer 2. These steps are repeated until a target object is obtained.

In this case, no separate movable pins are required, and the shape and size of the movable pins 21 can be determined freely depending on the positioning holes 22. In addition, the strength in the laminate direction of the sheet materials 8 can be easily increased during the processes of laminating the sheet materials 8.

The positioning of the sheet materials 8 may be carried out in a manner as shown in FIGS. 34A to 34F and FIGS. 35A to 35C. Two sheet materials 8 can be appropriately positioned with each other by bringing outer edges of an upper sheet material 8 into contact with positioning ribs 26 formed on the upper surface of a lower sheet material 8.

Figure 34A:
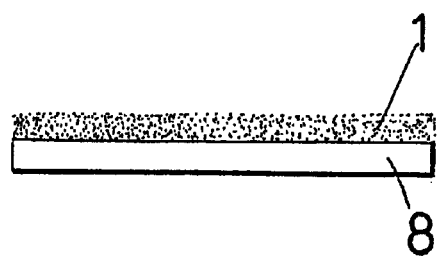
FIGS. 34A to 34F are views similar to FIGS. 33A to 33F, but illustrating the positioning process of a different sheet material.
Figure 34B:
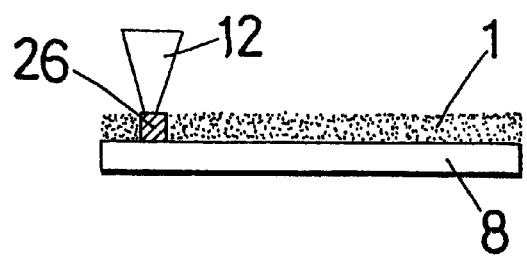
Figure 34C:
Figure 34D:
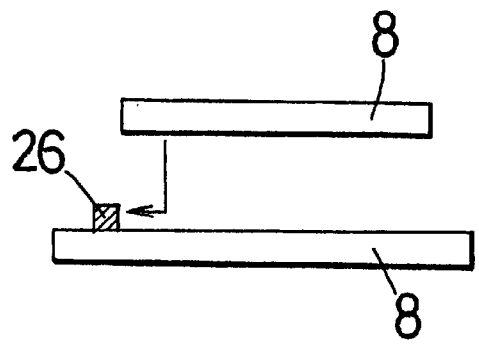
Figure 34E:
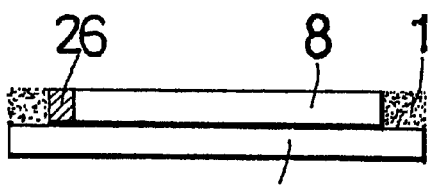
Figure 34F:
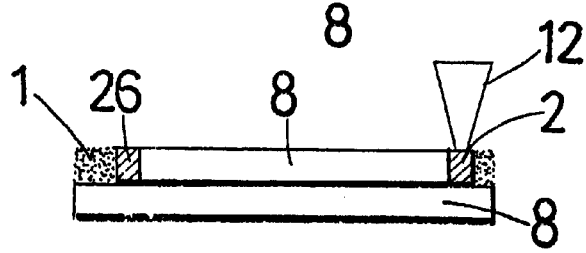
Figure 35A:
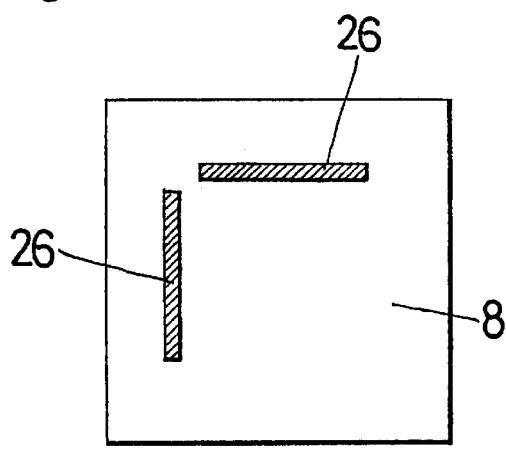
FIGS. 35A to 35C are top plan views of the sheet material during positioning thereof.
Figure 35B:
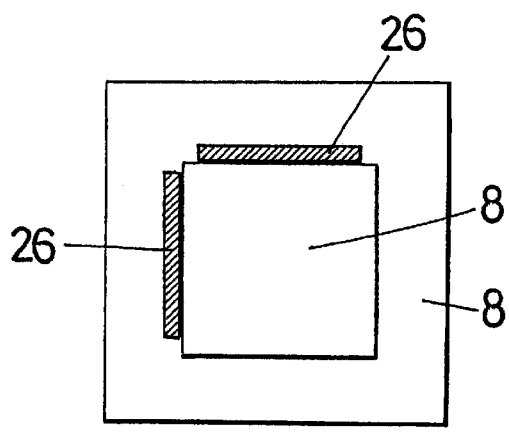
Figure 35C:
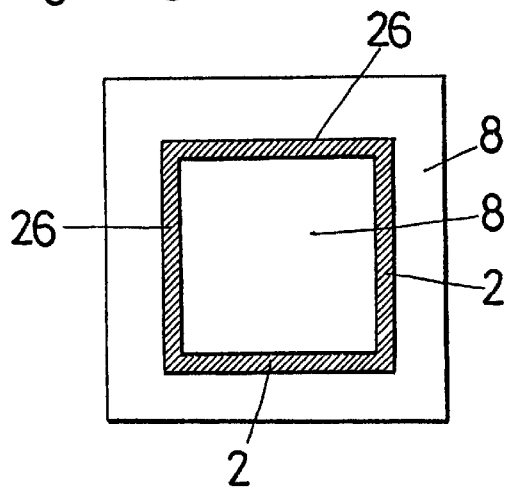

More specifically, as shown in FIG. 34A, a powder material 1 is first coated on the upper surface of the lower layer sheet material 8, and as shown in FIG. 34B, linear beams 12 are irradiated on predetermined portions of the powder material 1 to effect hardening and form the positioning ribs 26. As shown in FIG. 34C and FIG. 35A, the powder material 1 which remains unhardened is removed, and the positioning ribs 26 are caused to protrude from the upper surface of the sheet material 8. Thereafter, as shown in FIG. 34D and FIG. 35B, another sheet material 8 is laminated on the sheet material 8 having the positioning ribs 26. At this time, the outer edges of the upper layer sheet material 8 are held in contact with the positioning ribs 26, thereby positioning both the sheet materials 8 with each other. Then, as shown in FIGS. 34E and 34F and in FIG. 35C, a separate powder material 1 is filled, and a beam 12 is irradiated on the powder material 1 around the upper layer sheet material 8 other than those portions where the positioning ribs 26 have been formed, thereby forming the hardened layer 2. These steps are repeated until the target object is obtained.

Also, in this case, no separate positioning ribs are required, and the shape and size of the positioning ribs 26 can be determined freely. In addition, the strength in the laminate direction of the sheet materials 8 can be easily increased.

Figure 36A:
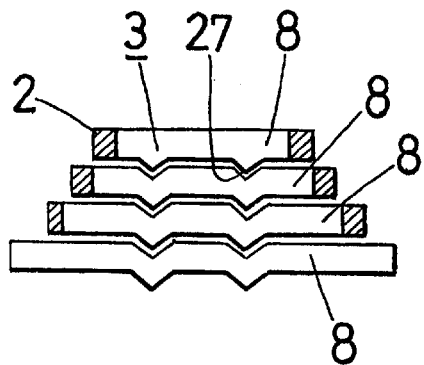
FIGS. 36A and 36B are schematic cross-sectional views of further different sheet materials during positioning thereof.
Figure 36B:
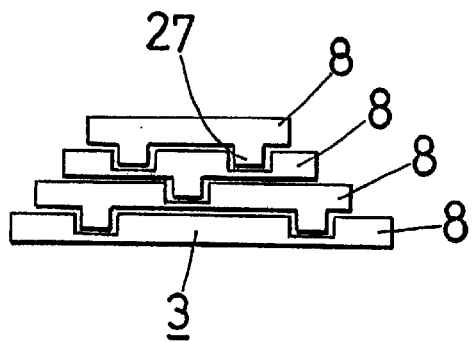
Figure 37:
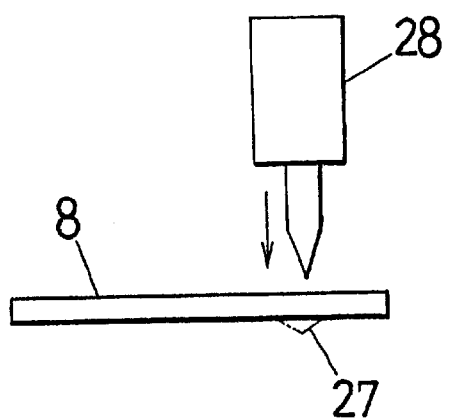
FIG. 37 is a schematic side view of one of the sheet materials shown in FIG. 36A when a positioning protrusion is being formed.

As shown in FIGS. 36A and 36B, the positioning of the sheet materials 8 can be performed by introducing protrusions 27 formed on the lower surfaces of the sheet materials 8 into depressions in the upper surfaces of the lower sheet materials 8. In this case, as shown in FIG. 37, the protrusions 27 and the depressions may be formed by pressing a punch against the upper surface of each sheet material 8 using a processor 28 for vertically moving the punch.

As shown in FIGS. 38A to 38E and in FIGS. 39A to 39E, as a final step following the hardening of all of the predetermined powder material 1 by sintering, mechanical processing may be performed on the upper surface of the shaped object. All the steps in this case are discussed hereinafter in the order of FIG. 38A to FIG. 38E and of FIG. 39A to FIG. 39E.

Figure 38A:
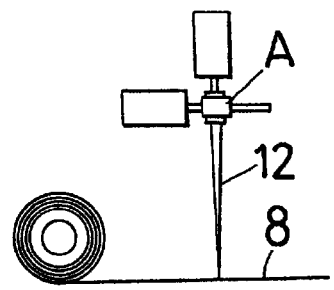
FIGS. 38A to 38E are schematic cross-sectional views of the sheet materials, illustrating all steps including the final machining process.
Figure 38B:
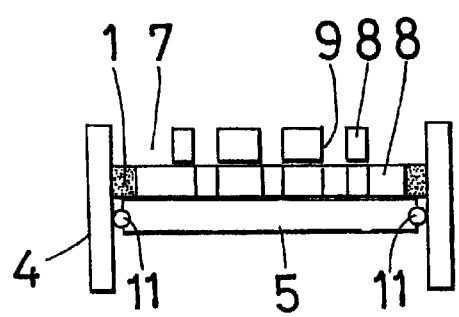
Figure 38C:
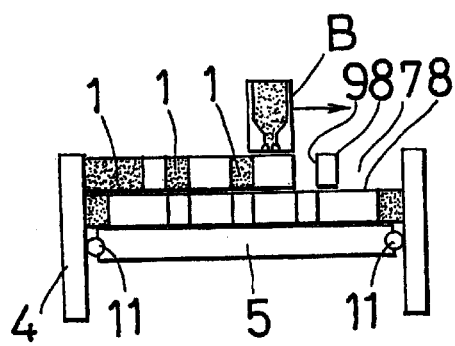
Figure 38D:
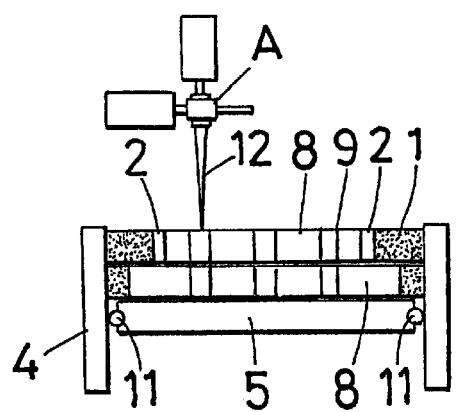
Figure 39A:
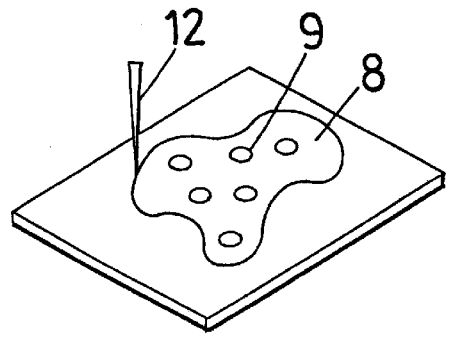
FIGS. 39A to 39E are schematic perspective views of the sheet materials corresponding to FIGS. 38A to 38E, respectively.
Figure 39B:
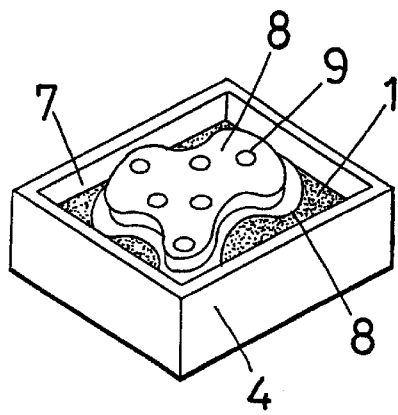
Figure 39C:
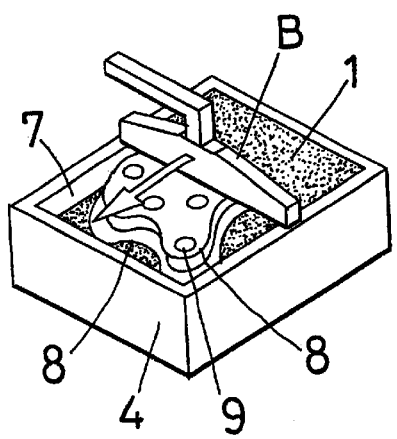
Figure 39D:
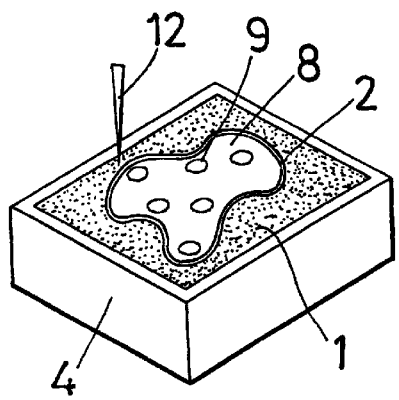

Firstly, as shown in FIG. 38A and FIG. 39A, a metal sheet material 8 wound around a roll is unwound, and a beam 12 is irradiated thereon to form through-holes 9 (holes for adhesion) and cut it into a shape having predetermined contour lines. Next, the sheet material 8, cut into the predetermined shape, is placed on a plate 5 surrounded by a side wall member 4. Then, as shown in FIGS. 38B to 38D and in FIGS. 39B to 39D, a powder material 1 is filled, from above, around the sheet material 8 and in the through-holes 9, and a beam 12 is irradiated from above the sheet material 8 to harden the powder material 1 filled around the sheet material 8 and in the through-holes 9, as in the embodiment shown in FIG. 7. If these steps are repeated twice, a two-layer shaped object is completed.

Figure 38E:
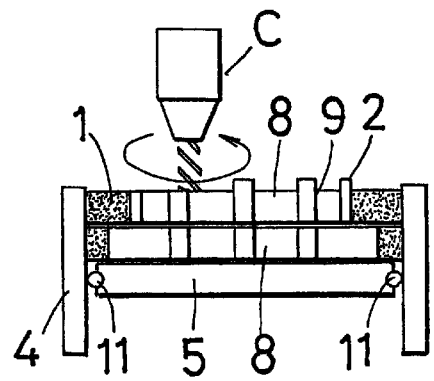
Figure 39E:
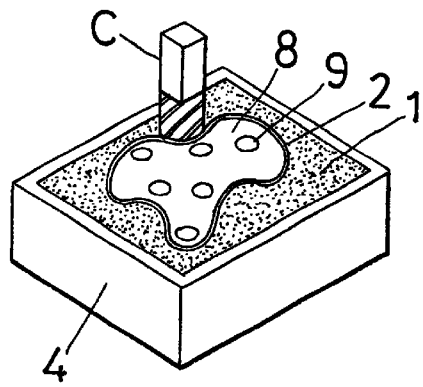

In this case, the beam 12 is irradiated from a laser irradiating device A, the powder material 1 is supplied and filled by a material supply device B, and the powder material 1 is sintered and hardened by the irradiation of the beam 12 to unite the sheet materials 8 via the contour line portions and the through-holes 9. In addition, as shown in FIG. 38E and FIG. 39E, as a final step, mechanical processing is performed on the upper surface of the shaped object. By so doing, those portions of the hardened powder material 1 (the hardened layers 2 around the sheet materials 8 and in the through-holes 9) which protrude from the upper surface of the shaped object are cut and removed by a processing device C.

In the above-described embodiments, different materials may be used for the embedded member 3 and the powder material 1. By way of example, iron or steel plates can be used for the embedded member 3, while ceramic powder or hard metal powder, which becomes harder than the embedded member 1 after hardening, can be used for the powder material 1. In this case, a shaped object is manufactured in a manner as shown in FIGS. 40A to 40D.

Figure 40A:
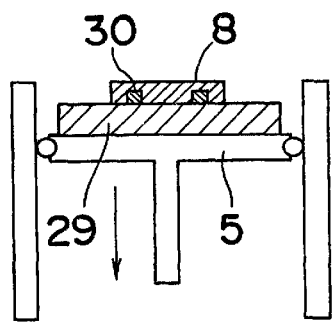
FIGS. 40A to 40D are schematic cross-sectional views of different sheet materials.
Figure 40B:
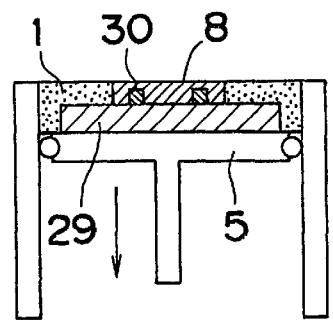
Figure 40C:
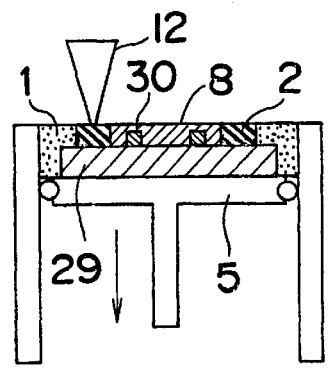

More specifically, as shown in FIG. 40A, a base plate 29 having positioning pins 30 formed thereon is first placed on the vertically movable plate 5, and a sheet material 8 is then placed on the base plate 29 and is appropriately positioned by the positioning pins 30. Thereafter, the plate 5 is lowered so that the upper surface of the sheet material 8 may be on the same level with the upper edge of the side wall member 4, and the powder material 1 is filled around the base plate 29 and the sheet material 8, as shown in FIG. 40B. After the beam 12 has been irradiated on the powder material 1 in the vicinity of the sheet material 8, as shown in FIG. 40C, the plate 5 is further lowered by a length L equal to the thickness of the next sheet material, which is placed on the sheet material 8 on the base plate 29. These steps are repeatedly carried out before a required number of sheet materials 8 are laminated and united together by the hardened layers 2.

Figure 40D:
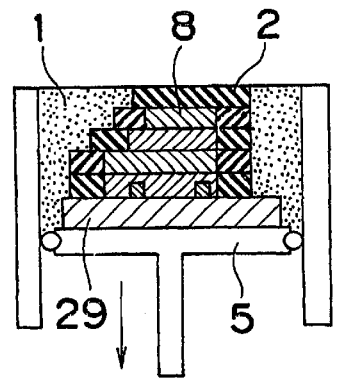

In this case, however, a hardened layer 2 is also formed on the upper surface of the uppermost sheet material 8 so that the embedded member 3 may be entirely covered with the hardened layers 2, as shown in FIG. 40D. The base plate 29 may be of the same material as the embedded member 3 or the same material as the powder material 1.

According to this method, shaped objects having a high surface hardness such, for example, as cutters, grinding tools and the like can be easily manufactured.

Alternatively, paper, plastic resin, aluminum or the like, which has a melting point lower than that of the powder material 1, may be used for the embedded member 3, while iron- or copper-based powder may be used for the powder material 1. In this case, the sheet materials 8 serves to merely support the powder material 1. Accordingly, the powder material 1 is not filled inside the embedded member 3, but is filled only around the embedded member 3.

Figure 41A:
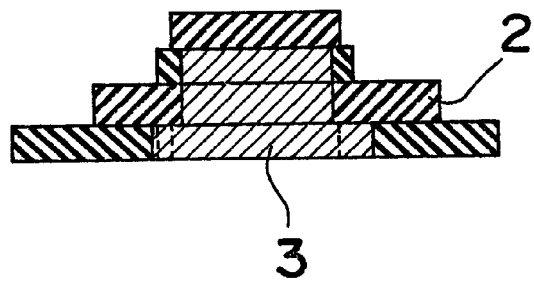
FIG. 41A is a schematic cross-sectional view of a shaped object having a core of a low melting point.
Figure 41B:
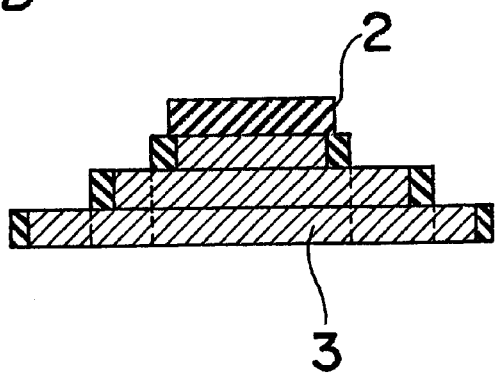
FIG. 41B is a schematic cross-sectional view of a comparative example of the shaped object of FIG. 41A

In this case, the shape of the embedded member 3 is determined so that the embedded member 3 may be entirely covered with the hardened powder material 2, as shown in FIG. 41A. If the embedded member 3 is not, even partially, covered with the hardened powder material 2, as shown in FIG. 41B, there is a good chance that some sheet materials 8 may be fused during shaping, resulting, in deformation of the shaped object.

Figure 42A:
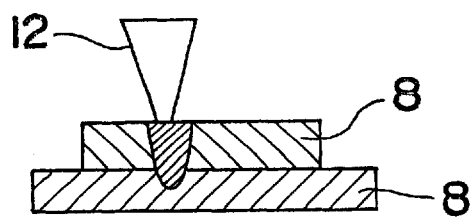
FIG. 42A is a schematic cross-sectional view of sheet materials constituting the core shown in FIG. 41A.

Because the embedded member 3 has a melting point lower than that of the powder material 1, a beam having an energy density lower than that of the beam used to harden the powder material 1 can be used to firmly join neighboring sheet materials 8, as shown in FIG. 42A, thereby preventing poor adhesion between the sheet materials 8.

Figure 42B:
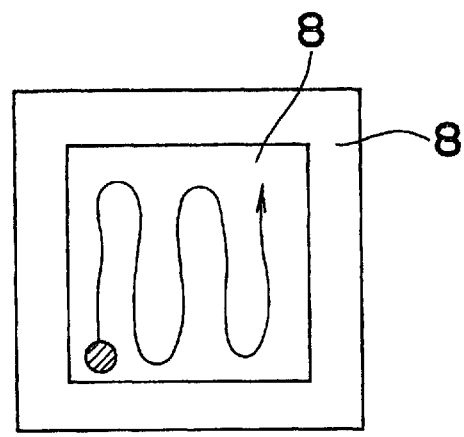
FIGS. 42B and 42C are top plan views of the sheet materials of FIG. 42A, particularly illustrating different modes of laser irradiation.
Figure 42C:
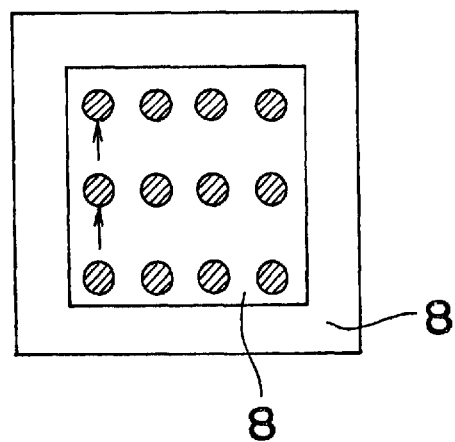

FIG. 42B depicts a manner in which an optical beam 12 is continuously scanned from above the upper sheet material 8 to fuse and join the neighboring sheet materials 8, while FIG. 42C depicts another manner in which the optical beam 12 is discretely or discontinuously scanned to selectively fuse and join the neighboring sheet materials 8. Alternatively, the optical beam 12 may be first discretely irradiated on the upper sheet material 8 to partially join the neighboring sheet materials 8 and then continuously irradiated to entirely join them. Again alternatively, ultrasonic vibration may be imparted to the neighboring sheet materials 8 to join them.

Because the joining energy required for joining the sheet materials 8 can be reduced, sheet materials having a thickness greater than the thickness by which the powder material is filled can be used, making it possible to shorten the shaping time.

If the embedded member 3 has a melting point lower than that of the powder material 1, the embedded member 3 can be removed from the hardened powder material 2.

Figure 43:
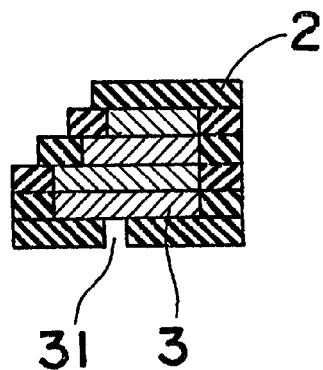
FIG. 43 is a schematic cross-sectional view of a different shaped object.

In this case, immediately after the start of the shaping, several layers are formed with only the powder material 1 to form a bottom wall of a required thickness of the shaped object. After the hardening of the powder material 1 has been finished, a through-hole 31 is formed in the bottom wall, as shown in FIG. 43. By so doing, the embedded member 3 can be removed from the hardened powder material 2 through the through-hole 31 by heating the shaped object to fuse or burn down the embedded member 3 or by dissolving the embedded member 3 with a chemical.

Instead of forming the through-hole 31 in the bottom wall, of the shaped object, a portion of the bottom wall may be formed with the embedded member 3. In this case, subsequent formation of the though-hole 31 is not required.

Figure 44A:
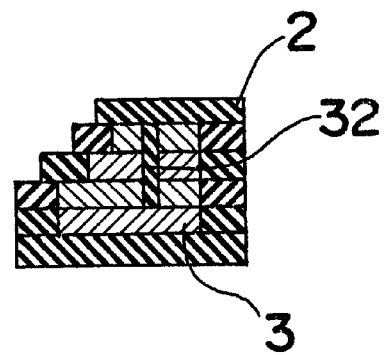
FIG. 44A is a schematic cross-sectional view of a further different shaped object.
Figure 44B:
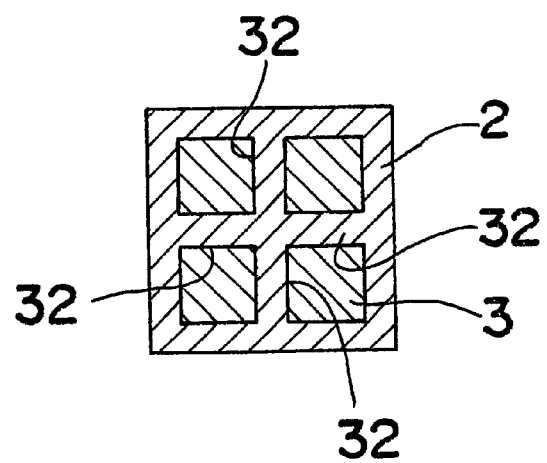
FIG. 44B is a schematic horizontal sectional view of the shaped object of FIG. 44A.

In order to prevent deformation of the shaped object after removal of the embedded member 3, the embedded member 3 may be so designed that a plurality of ribs 32 are formed inside the shaped object, as shown in FIGS. 44A and 44B.

Figure 45:
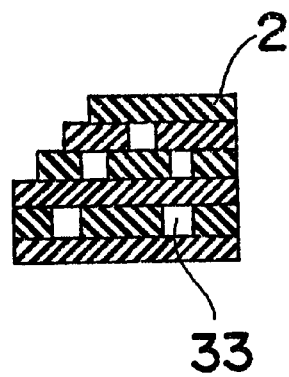
FIG. 45 is a schematic cross-sectional view of another shaped object.

FIG. 45 depicts a mold, which is a typical example of the shaped objects from which the embedded member has been removed. This mold has water or air passages 33 for cooling use, which are formed by removing the embedded member from the shaped object.

With this configuration, shaped objects having a cavity or a complicated inner structure such as castings can be easily manufactured, or the weight of the shaped objects can be reduced.

Referring to FIG. 43 again, a molten metal or a fluidic material (concrete, resin or the like) may be filled in the hollowed object via the through-hole 31 to obtain a 100% internal density. If copper is filled in the hollowed object, the thermal conductivity thereof is increased, and if aluminum is filled therein, not only can the thermal conductivity thereof be increased but the weight thereof can also be reduced. A heater can be made by filling the hollowed object with an electric resistance material. Furthermore, a foaming mold can be made by filling the hollowed object with concrete. In addition, a shaped object having heat storage effects can be made by filling a high-polymer resin therein.

FIGS. 46A to 46E depict a method of manufacturing a laminated circuit, which is somewhat similar to the method shown in FIGS. 3A to 3E.

Figure 46A:
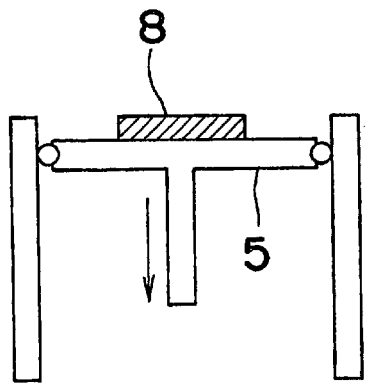
FIGS. 46A to 46E are schematic cross-sectional views of the manufacturing process of a further shaped object.
Figure 46B:
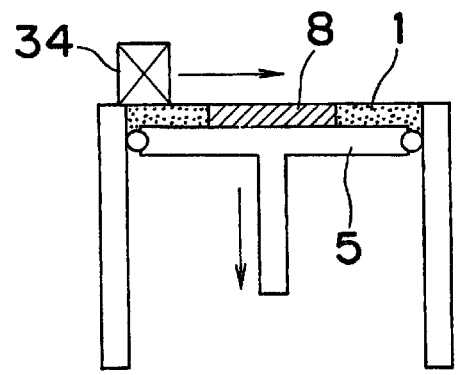
Figure 46C:
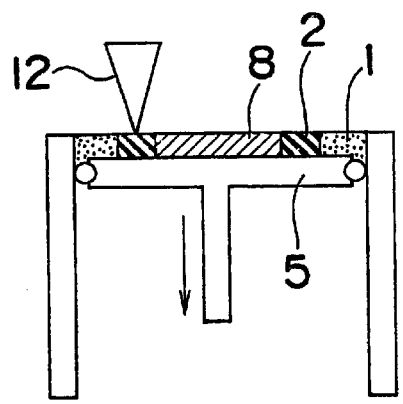
Figure 46D:
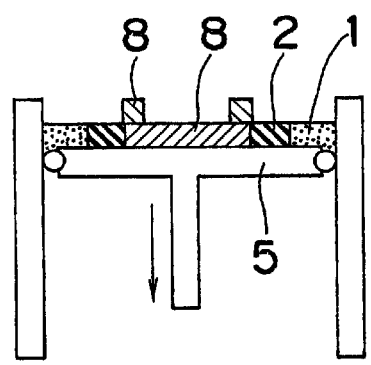
Figure 46E:
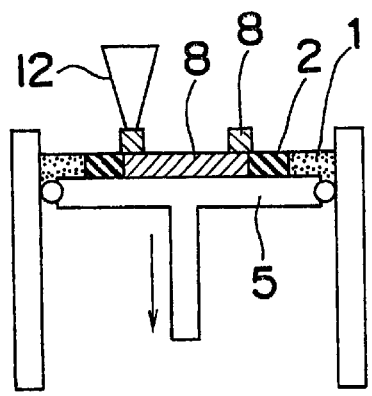
Figure 47:
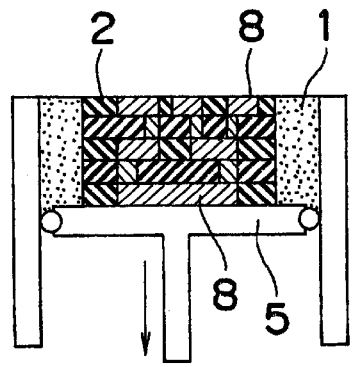
FIG. 47 is a schematic cross-sectional view of another shaped object.

As shown in FIG. 46A, after a conductive sheet material 8 has been placed on the plate 5, the plate 5 is lowered by a length L corresponding to the thickness of the conductive sheet material 8. As shown in FIG. 46B, an insulating powder material 1 is then filled in a space around the conductive sheet material 8, and the upper surface of the conductive sheet material 8 is selectively coated with the insulating powder material 1 using a powder coating device 34. Thereafter, as shown in FIG. 46C, a beam 12 is irradiated on the insulating powder material 1 in the vicinity of the peripheral edge of the conductive sheet material 8, thereby forming a hardened layer 2, and as shown in FIG. 46D, the plate 5 is lowered by the length L, while the next conductive sheet material 8 is placed on the upper surface of the first conductive sheet material 8. Then, as shown in FIG. 46E, the beam 12 is irradiated on the upper conductive sheet material 8 to join the upper and lower conductive sheet materials 8 to each other. The steps shown in FIGS. 46B to 46E are repeatedly carried out a large number of times, resulting in a laminated circuit structure, as shown in FIG. 47, having a three-dimensional circuit.

Copper sheets are preferably used for the conductive sheet materials 8, while resinous powder is preferably used for the insulating powder material 1.

According to this method, three-dimensional circuits can be simply made without the need of a wet process such as plating or the like. Also, this method does not require a printing process of printing resists that form insulating layers, a water-washing process, a process of removing unnecessary copper, and the like. Furthermore, because no printing masks are required, the circuits can be made within a reduced period of time.

Figure 48:
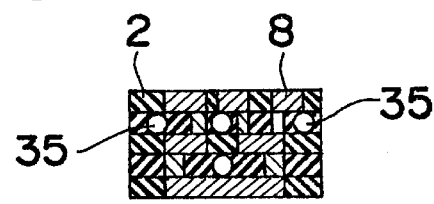
FIG. 48 is a view similar to FIG. 47, but illustrating a further shaped object.

FIG. 48 depicts another laminated circuit having cooling pipes 35 embedded therein. Although in FIG. 48 the cooling pipes 35 are embedded in the hardened layers 2, they may be embedded in the conductive sheet materials 8. In place of the cooling pipes 35, a heater or heaters can be embedded.

Figure 49A:
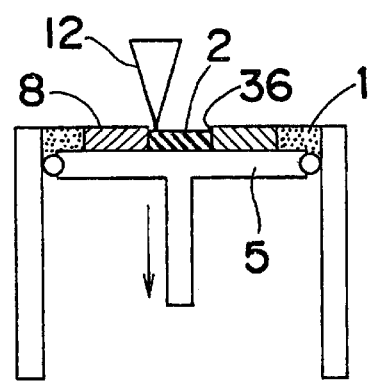
FIGS. 49A and 49B depicts a method of manufacturing a three-dimensional object according to a ninth embodiment of the present invention.
Figure 49B:
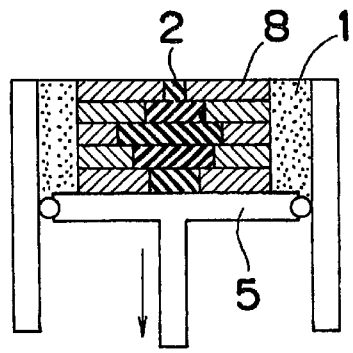
Figure 50A:
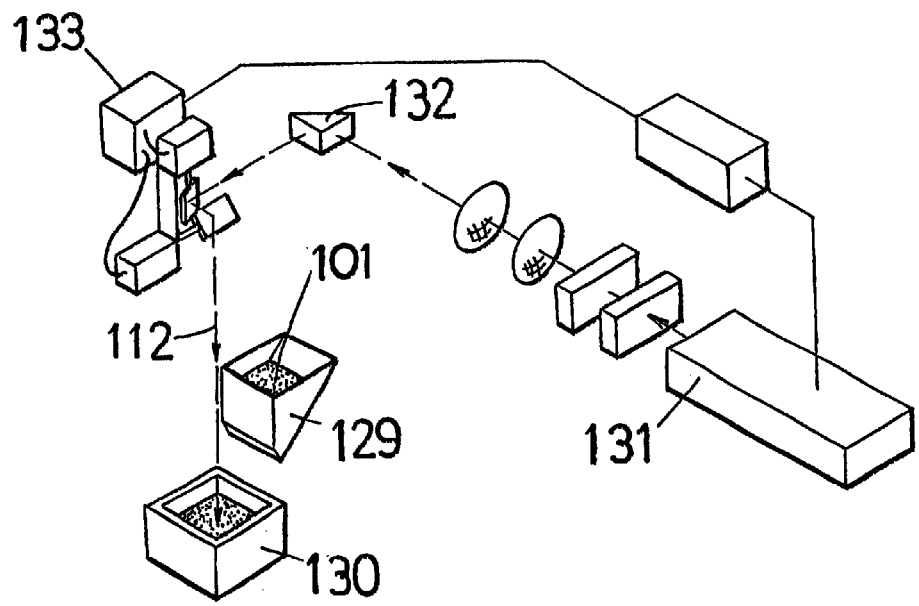
FIG. 50A is a perspective view of a conventional apparatus for manufacturing a three-dimensional object.
Figure 50B:
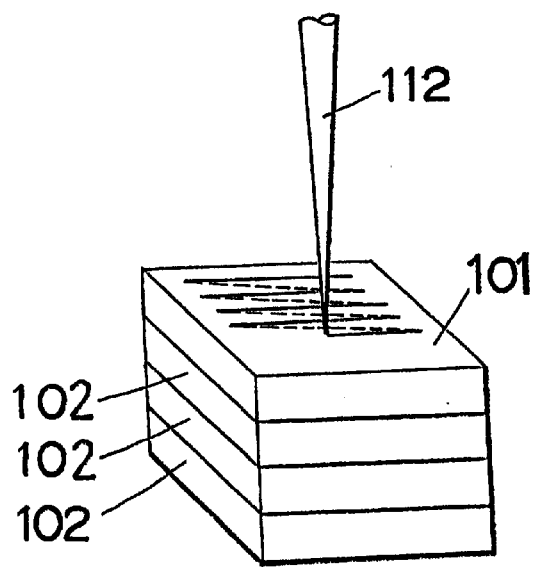
FIG. 50B is a perspective view of hardened layers laminated one upon another by the conventional apparatus of FIG. 50A.

FIGS. 49A and 49B depicts a method of manufacturing a three-dimensional object according to a ninth embodiment of the present invention, wherein the three-dimensional object is formed with hardened layers 2.

More specifically, as shown in FIG. 49A, a sheet material 8 having a cutout 36 is first placed and appropriately positioned on the plate 5, which is in turn lowered by a length L corresponding to the thickness of the sheet material 8, Then, resinous powder 1 is filled in a space around the sheet material 8 and also in the cutout 36. At this time, pressure is applied to the powder material 1 filled in the cutout 36 to increase the density thereof, and a beam 12 is subsequently irradiated on the powder material 1 in the cutout 36 to form a hardened layer 2. By repeating these steps, a shaped object surrounded by the sheet materials 8 is obtained, as shown in FIG. 49B. After the shaping, the shaped object is taken out by removing the sheet materials 8 therefrom.

According to this method, any three-dimensional objects having a double structure such, for example, as a bell or those having overhangs can be easily made, because the sheet materials 8 serve to support the powder material 1 or prevent deformation of the shaped object. Furthermore, unevenness of the side surfaces of the shaped object or that of the lower surfaces of the overhangs can be reduced, thus enhancing the surface accuracy of the shaped object. That is, the sheet materials disposed laterally of the powder material 1 or, below the overhangs prevent the power material more than necessary from being hardened due to heat conduction. In the absence of the sheet materials 8, even if the beam 12 is not irradiated, powder material close to the portion on which the beam 12 is irradiated is fused due to heat conduction, thus deteriorating the surface roughness.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of manufacturing a three-dimensional object, comprising:

(a) filling a powder material around a core so as to form a layer of powder material;

(b) selectively irradiating a beam on the layer of powder material to form a hardened layer united with the core;

(c) repeating (a) and (b) to form a plurality of hardened layers around the core, thereby manufacturing the three-dimensional object having the core embedded therein;

the core comprises a plurality of sheet materials laminated one above another, each of the plurality of sheet materials being an organic material or an inorganic material and being laminated before (a); and the plurality of sheet materials are appropriately positioned by a positioning member formed on at least one of the plurality of sheet materials by irradiating a beam on a powder material coated on the at least one of the plurality of sheet materials.

\* \* \* \* \*